United States Patent
Xian et al.

(10) Patent No.: US 11,645,523 B2
(45) Date of Patent: May 9, 2023

(54) GENERATING EXPLANATORY PATHS FOR PREDICTED COLUMN ANNOTATIONS

(71) Applicant: Adobe Inc., San Jose, CA (US)

(72) Inventors: Yikun Xian, Edison, NJ (US); Tak Yeon Lee, San Jose, CA (US); Sungchul Kim, San Jose, CA (US); Ryan Rossi, Mountain View, CA (US); Handong Zhao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 466 days.

(21) Appl. No.: 16/796,681

(22) Filed: Feb. 20, 2020

(65) Prior Publication Data
US 2021/0264244 A1 Aug. 26, 2021

(51) Int. Cl.
| | |
|---|---|
| *G06F 16/22* | (2019.01) |
| *G06F 16/2457* | (2019.01) |
| *G06F 16/248* | (2019.01) |
| *G06F 16/901* | (2019.01) |
| *G06N 3/08* | (2023.01) |
| *G06N 5/02* | (2023.01) |

(52) U.S. Cl.
CPC .............. *G06N 3/08* (2013.01); *G06F 16/221* (2019.01); *G06F 16/248* (2019.01); *G06F 16/24578* (2019.01); *G06F 16/9024* (2019.01); *G06N 5/02* (2013.01)

(58) Field of Classification Search
CPC ............ G06N 3/08; G06N 5/02; G06N 5/022; G06N 5/045; G06N 20/00; G06F 16/221; G06F 16/24578; G06F 16/248; G06F 16/9024
See application file for complete search history.

(56) References Cited

U.S. PATENT DOCUMENTS

| | | | |
|---|---|---|---|
| 10,650,050 B2 * | 5/2020 | He | G06F 16/217 |
| 11,194,576 B1 * | 12/2021 | Botha | G06N 20/00 |

(Continued)

OTHER PUBLICATIONS

Xiong et al., "DeepPath: A Reinforcement Learning Method for Knowledge Graph Reasoning", Jul. 7, 2018, University of California, Santa Barbara, pp. 1-10 (Year: 2018).*

(Continued)

*Primary Examiner* — Jorge A Casanova
(74) *Attorney, Agent, or Firm* — Keller Preece PLLC

(57) ABSTRACT

Systems, methods, and non-transitory computer-readable media are disclosed for generating generate explanatory paths for column annotations determined using a knowledge graph and a deep representation learning model. For instance, the disclosed systems can utilize a knowledge graph to generate an explanatory path for a column label determination from a deep representation learning model. For example, the disclosed systems can identify a column and determine a label for the column using a knowledge graph (e.g., a representation of a knowledge graph) that includes encodings of columns, column features, relational edges, and candidate labels. Then, the disclosed systems can determine a set of candidate paths between the column and the determined label for the column within the knowledge graph. Moreover, the disclosed systems can generate an explanatory path by ranking and selecting paths from the set of candidate paths using a greedy ranking and/or diversified ranking approach.

20 Claims, 14 Drawing Sheets

(56) References Cited

U.S. PATENT DOCUMENTS

| | | | |
|---|---|---|---|
| 11,250,342 B2* | 2/2022 | Maor | G06F 16/285 |
| 11,295,491 B2* | 4/2022 | Kumari | G06F 17/10 |
| 2015/0193423 A1* | 7/2015 | Folting | G06Q 10/10 715/212 |
| 2016/0092557 A1* | 3/2016 | Stojanovic | G06F 16/355 707/723 |
| 2018/0004722 A1* | 1/2018 | Naor | G06F 16/93 |
| 2018/0075104 A1* | 3/2018 | Oberbreckling | G06F 16/2456 |
| 2018/0144004 A1* | 5/2018 | Bedi | G06F 16/9024 |
| 2018/0240019 A1* | 8/2018 | Sato | G06N 20/00 |
| 2018/0341839 A1* | 11/2018 | Malak | G06V 30/2272 |
| 2019/0102438 A1* | 4/2019 | Murray | G06F 16/221 |
| 2019/0251122 A1* | 8/2019 | Rivas | G06F 16/24578 |
| 2020/0073988 A1* | 3/2020 | Liu | G06F 16/254 |
| 2020/0081899 A1* | 3/2020 | Shapur | G06F 16/211 |
| 2021/0058345 A1* | 2/2021 | Yoon | H04L 51/02 |
| 2021/0149896 A1* | 5/2021 | Yu | G06K 9/6215 |
| 2021/0216521 A1* | 7/2021 | Jia | G06F 16/367 |
| 2021/0240677 A1* | 8/2021 | Kashalikar | G06F 16/215 |
| 2021/0326519 A1* | 10/2021 | Lin | G06N 20/00 |
| 2022/0121884 A1* | 4/2022 | Zadeh | G06N 3/0436 |

OTHER PUBLICATIONS

Lin et al., "Multi-Hop Knowledge Graph Reasoning with Reward Shaping", Sep. 11, 2018, Salesforce Research, pp. 1-12 (Year: 2018).*

Li et al., "Path Reasoning over Knowledge Graph: A Multi-Agent and Reinforcement Learning Based Method", 2018, IEEE Computer Society, pp. 929-936 (Year: 2018).*

Qingyao Ai, Vahid Azizi, Xu Chen, and Yongfeng Zhang. Learning heterogeneous knowledge base embeddings for explainable recommendation. Algorithms, 11(9):137, 2018.

Jacob Berlin and Amihai Motro. Database schema matching using machine learning with feature selection. In International Conference on Advanced Information Systems Engineering, pp. 452-466. Springer, 2002.

Antoine Bordes, Nicolas Usunier, Alberto Garcia-Duran, Jason Weston, and Oksana Yakhnenko. Translating embeddings for modeling multi-relational data. In Advances in neural information processing systems, pp. 2787-2795, 2013.

Olivier Chapelle, Bernhard Scholkopf, and Alexander Zien. Semi-supervised learning (chapelle, o. et al., eds.; 2006)[book reviews], IEEE Transactions on Neural Networks, 20(3):542-542, 2009.

Jiaoyan Chen, Ernesto Jiménez-Ruiz, Ian Horrocks, and Charles Sutton. Colnet: Embedding the semantics of web tables for column type prediction. 2019.

Jiaoyan Chen, Ernesto Jimenez-Ruiz, Ian Horrocks, and Charles Sutton. Learning semantic annotations for tabular data. arXiv preprint arXiv:1906.00781, 2019.

Wayne W Daniel. Kruskal-wallis one-way analysis of variance by ranks. Applied nonparametric statistics, pp. 226-234, 1990.

Dong Deng, Yu Jiang, Guoliang Li, Jian Li, and Cong Yu. Scalable column concept determination for web tables using large knowledge bases. Proceedings of the VLDB Endowment, 6(13):1606-1617, 2013.

Vasilis Efthymiou, Oktie Hassanzadeh, Mariano Rodriguez-Muro, and Vassilis Christophides. Matching web tables with knowledge base entities: from entity lookups to entity embeddings. In International Semantic Web Conference, pp. 260-277. Springer, 2017.

Open Knowledge Foundation. messytables: Tools for parsing messy tabular data. https://github.com/okfn/messytables, 2019.

Google. Google data studio. https://datastudio.google.com, 2019.

Xu Han, Shulin Cao, Xin Lv, Yankai Lin, Zhiyuan Liu, Maosong Sun, and Juanzi Li. Openke: An open toolkit for knowledge embedding. In Proceedings of EMNLP, pp. 139-144, 2018.

Madelon Hulsebos, Kevin Hu, Michiel Bakker, Emanuel Zgraggen, Arvind Satyanarayan, Tim Kraska, Çagatay Demiralp, and César Hidalgo. Sherlock: A deep learning approach to semantic data type detection. In Proceedings of the 25th ACM SIGKDD International Conference on Knowledge Discovery & Data Mining. ACM, 2019.

Diederik P Kingma and Jimmy Ba. Adam: A method for stochastic optimization. arXiv preprint arXiv:1412.6980, 2014.

Interactive Data Lab. Datalib: Javascript data utilities. http://vega.github.io/ datalib, 2019.

Girija Limaye, Sunita Sarawagi, and Soumen Chakrabarti. Annotating and searching web tables using entities, types and relationships. Proceedings of the VLDB Endowment, 3(1-2):1338-1347, 2010.

Jayant Madhavan, Philip A Bernstein, and Erhard Rahm. Generic schema matching with cupid. In vldb, vol. 1, pp. 49-58, 2001.

Henry B Mann and Donald R Whitney. On a test of whether one of two random variables is stochastically larger than the other. The annals of mathematical statistics, pp. 50-60, 1947.

Microsoft. Power bi | interactive data visualization bi tools. https://powerbi.microsoft.com, 2019.

Tomas Mikolov, Ilya Sutskever, Kai Chen, Greg S Corrado, and Jeff Dean. Distributed representations of words and phrases and their compositionality. In Advances in neural information processing systems, pp. 3111-3119, 2013.

Duy Hoa Ngo and Zohra Bellahsene. Yam++:(not) yet another matcher for ontology matching task. In BDA: Bases de Donnëes Avancées, 2012.

Eric Peukert, Julian Eberius, and Erhard Rahm. A self-configuring schema matching system. In 2012 IEEE 28th International Conference on Data Engineering, pp. 306-317. IEEE, 2012.

Minh Pham, Suresh Alse, Craig A Knoblock, and Pedro Szekely. Semantic labeling: a domain-independent approach. In International Semantic Web Conference, pp. 446-462. Springer, 2016.

Gianluca Quercini and Chantal Reynaud. Entity discovery and annotation in tables. In Proceedings of the 16th International Conference on Extending Database Technology, pp. 693-704. ACM, 2013.

S Krishnamurthy Ramnandan, Amol Mittal, Craig A Knoblock, and Pedro Szekely. Assigning semantic labels to data sources. In European Semantic Web Conference, pp. 403-417. Springer, 2015.

Dominique Ritze. Web-scale web table to knowledge base matching. PhD thesis, 2017.

Dominique Ritze and Christian Bizer. Matching web tables to dbpedia—a feature utility study. context, 42(41):19, 2017.

Yikun Xian, Zuohui Fu, S Muthukrishnan, Gerard de Melo, and Yongfeng Zhang. Reinforcement knowledge graph reasoning for explainable recommendation. SIGIR, 2019.

* cited by examiner

GENERATING EXPLANATORY PATHS FOR PREDICTED COLUMN ANNOTATIONS

BACKGROUND

Recent years have seen a rapid increase in the storage, management, distribution, and analysis of large quantities of digital data volumes. For instance, current data analytics systems often identify and import large repositories of digital information from remote data servers and then analyze these data repositories utilizing complex data analysis models such as neural networks, prediction models, or other analytical algorithms. Some conventional data analytics systems often match labels for datasets to integrate the datasets within large repositories of digital information. Although conventional data analytics systems can identify, import, and analyze large, complex data volumes, conventional systems have a number of shortcomings with regard to accuracy, flexibility, and efficiency in extracting, annotating, and loading these volumes.

For example, conventional systems provide insufficient justifications with regard to matched labels. To illustrate, some conventional data analytics systems utilize complex prediction models such as neural networks to generate label matches. Due to the black box nature of such complex prediction models, such conventional systems are limited in transparency for the label matching process. For instance, some conventional systems that utilize complex neural networks can identify input features used in generating a prediction but do not demonstrate a logical reason or explanation for the label match.

In addition, conventional data analytics systems are rigid. In particular, due to the limited transparency of complex prediction models, many conventional systems often have to select between matching performance and transparency of the model. For example, some conventional systems utilize less complex prediction models (e.g., rule-based approaches, linear regression, decision trees) as they provide more transparency (at least for experts that can interpret the internal model processes). However, such prediction models are limited in matching performance as they are often inaccurate or have poor generalization ability on unseen data and/or new labels. Moreover, such models are monotonous and lack diversity in what the internal model can reveal. On the other hand, as mentioned above, conventional systems that utilize more complex prediction models provide inadequate information regarding their internal processes. Accordingly, many conventional data analytics systems rigidly require selection between matching performance and transparency into the selection model.

Moreover, due to the inaccuracies and the rigidness of many conventional systems, such systems are also inefficient. Specifically, conventional data analytics systems often require significant user interaction through various user interfaces to verify matched labels for correctness and to avoid problems relating to incorrect integration and poor dependability for downstream tasks using matched labels. Moreover, conventional systems often lead to undetected instances of incorrect label matches in conventional systems. These undetected instances often do not integrate into data repositories correctly and also cause inefficiencies and functional performance issues in downstream tasks.

These and other problems exist with regard to conventional data analytics systems.

SUMMARY

The disclosure describes one or more embodiments that provide benefits and solve one or more of the foregoing or other problems in the art with systems, non-transitory computer-readable media, and methods that generate explanatory paths for column annotations determined using a knowledge graph and a deep representation learning model. In particular, the disclosed systems can utilize a knowledge graph to generate explanatory paths that provide accurate and efficient transparency into column annotation approaches that use deep learning based models to determine the column annotations. For instance, the disclosed systems can cast columns, column features, relational edges, and candidate labels into a knowledge graph. The disclosed systems can use deep representation learning to generate a knowledge graph representation that captures relational structures of the columns, column features, and the candidate label such that connectivity between them (based on the relational edges) can be utilized to generate explanatory paths. Indeed, the disclosed systems can determine (or predict) a label for a column using the knowledge graph and then determine an explanatory path (or paths) from the knowledge graph between the column, neighbor nodes, and the determined label using cumulative distance scores corresponding to individual paths. Additionally, to diversify the explanatory paths, the disclosed systems can prioritize different patterns over the distance scores of the paths using a diversified ranking approach.

BRIEF DESCRIPTION OF THE DRAWINGS

The detailed description is described with reference to the accompanying drawings in which.

DETAILED DESCRIPTION

Figure 1:
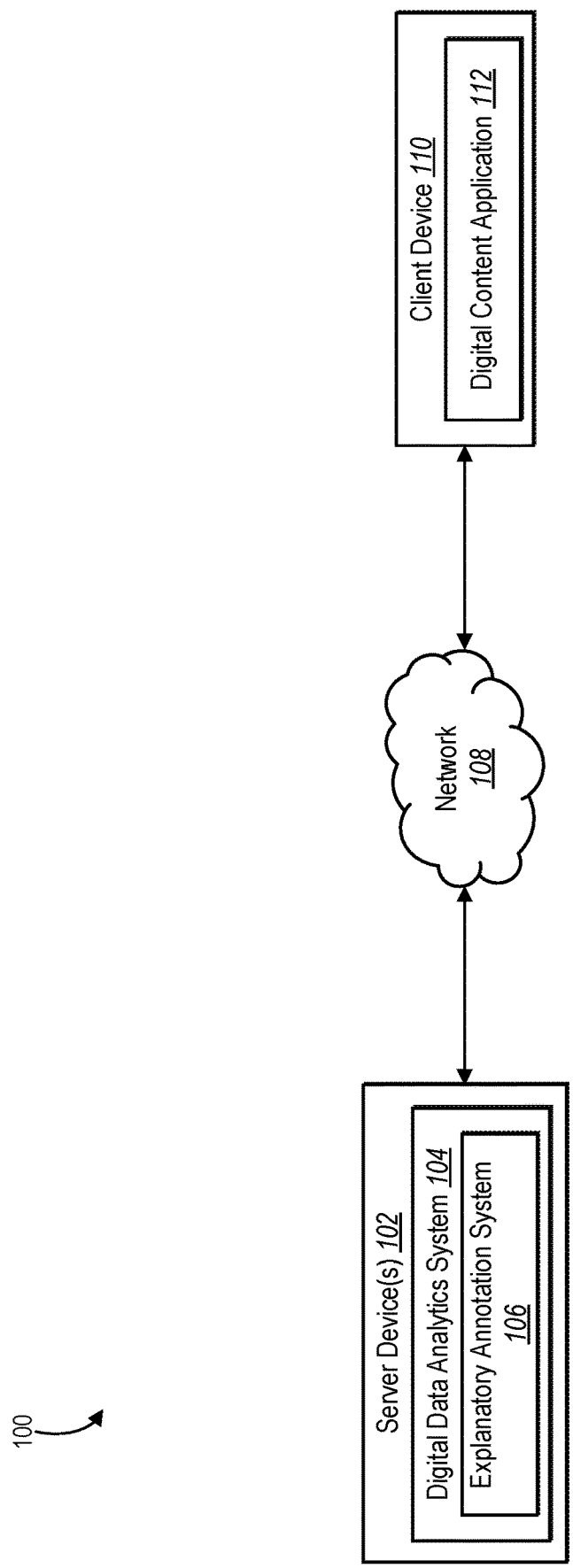
FIG. 1 illustrates a schematic diagram of an example system environment in which an explanatory annotation system can operate in accordance with one or more embodiments.

One or more embodiments of the present disclosure include an explanatory annotation system that utilizes deep representation learning in conjunction with a knowledge graph to generate column labels with explanatory paths for large data volumes. In particular, the explanatory annotation system can utilize a deep representation learning model to encode column nodes, column features, relational edges, and candidate labels within a knowledge graph representation in latent space. The explanatory annotation system can utilize the knowledge graph to determine a label for a column using annotation distance scores between representations of candidate labels and the column within the knowledge graph. In addition, the explanatory annotation system can explore candidate paths using relational edges leading from the column embedding to the label embedding within the knowledge graph. In particular, the explanatory annotation system can utilize a greedy ranking approach or a diversified ranking approach that uses relational edge sequences and cumulative distance scores to generate and surface explanatory paths to client devices. Accordingly, the explanatory annotation system can accurately, flexibly, and efficiently generate an explanatory path that provides transparency into the label determination process while also using deep learning based models for accurate column annotation.

As mentioned, the explanatory annotation system can process columns within a digital dataset to generate a knowledge graph. For example, the explanatory annotation system can receive a large repository of data from a client device, where the data repository is organized into (thousands or millions) of columns. The explanatory annotation system can extract one or more column features and cast these features to a knowledge graph. For instance, the explanatory annotation system can extract column features such as cell-level statistics, character-level statistics, cell keywords, and/or header (or label) keywords and add these column features to a knowledge graph. The explanatory annotation system can populate a knowledge graph with columns, column features, and corresponding labels entities or nodes.

The explanatory annotation system can also utilize deep representation learning to determine relations for the knowledge graph. In particular, given a knowledge graph of column, feature, and label nodes, the explanatory annotation system can learn the relational structure between the nodes. For example, the explanatory annotation system can execute a training phase that learns relational edges between nodes within a latent space. Specifically, the explanatory annotation system can learn relational projections between entities in multi-dimensional space by utilizing an optimization function that seeks to reduce a measure of loss reflecting distances between related entities within the knowledge graph.

Once the knowledge graph is constructed, the explanatory annotation system can utilize the knowledge graph to determine a label and explanatory path(s) corresponding to the label. For example, in constructing a knowledge graph, the explanatory annotation system can encode a particular column and then search within the knowledge graph for a label corresponding to the column. Specifically, the explanatory annotation system can determine a label for the identified column by using annotation distance scores between the identified column and candidate labels within the knowledge graph.

Furthermore, upon determining a label for the identified column, the explanatory annotation system can also determine a set of candidate paths within the knowledge leading from the column to the determined label. A candidate path can include a sequence of relational edges that connect the identified column, one or more neighbor nodes (e.g., intermediate nodes), and the determined label within the knowledge graph. For instance, the explanatory annotation system can determine a candidate path by utilizing distance values to select a relational edge leading from the identified column to a first neighbor node within the knowledge graph. The explanatory annotation system can similarly utilize additional distance values to identify relational edges leading from the first neighbor node to the determined label. In this manner, the explanatory annotation system can identify a variety of candidate paths between the identified column and the determined label within the knowledge graph.

Moreover, the explanatory annotation system can generate one or more explanatory paths from a set of candidate paths. For instance, the explanatory annotation system can select an explanatory path from the candidate paths by ranking the candidate paths based on cumulative distance scores. Specifically, in some embodiments, the explanatory annotation system utilizes a greedy ranking approach to determine explanatory paths. The explanatory annotation system can provide the explanatory paths for display to provide an explanation into the reasons or justifications for selecting the determined label.

In some embodiments, the explanatory annotation system can also select explanatory paths while emphasizing diversity. Indeed, it is possible that utilizing a greedy ranking approach can result in duplicative or similar explanations. The explanatory annotation system can reduce uniformity by generating explanatory paths using cumulative distance scores and relational edge sequence diversities corresponding to the set of candidate paths. As an example, the explanatory annotation system can identify different relational edge sequence patterns within candidate paths. The explanatory annotation system can then select multiple candidate paths using cumulative distance scores corresponding to the paths and from these different relational edge sequence patterns.

The disclosed explanatory annotation system provides several advantages over conventional systems. For example, the explanatory annotation system can generate explanatory paths that provide accurate explanations for determined column labels (i.e., determined column annotations). Indeed, the explanatory annotation system generates explanatory paths that accurately demonstrate reasonings for column label determinations from deep learning models. Additionally, by using cumulative distance scores and relational edge sequence diversities of candidate paths, the explanatory annotation system can also generate explanatory paths that provide multiple and diverse explanations in regard to why a deep learning model (that normally acts like a black box) determined a specific label for a column. Indeed, such diversity of explanation is informative (i.e., readable and understandable by users) and can be utilized to accurately verify the correctness of a determined label for a column.

Furthermore, the explanatory annotation system can improve flexibility and functionality by providing explanations with regard to accurate labels generated by a deep learning model. Specifically, as mentioned above, the explanatory annotation system can generate explanatory paths for column label determinations utilizing a knowledge graph and deep representation learning. Accordingly, the explanatory annotation system can provide accuracy in, both, a determined label and an explanation for the determined label. As mentioned above, the explanatory annotation system can also improve flexibility in generating a diverse set of explanatory paths that provide a range of explanations for the resulting label.

As a result of the accuracy and flexibility of the explanatory annotation system, the explanatory annotation system is also efficient. Indeed, explanatory paths generated by the explanatory annotation system provide understandable explanations of a complex label determination approach. The explanatory annotation system can provide the explanatory paths to verify the correctness of a determined label, resulting in fewer instances of undetected, incorrect labels. Due to this verification process, the explanatory annotation system results in column label matches for datasets that efficiently integrate into data structures and/or result in fewer errors in downstream uses of the datasets, which results in fewer revisions and more efficient utilization of resources.

As illustrated by the foregoing discussion, the present disclosure utilizes a variety of terms to describe features and advantages of the explanatory annotation system. Additional detail is now provided regarding the meaning of such terms. As used herein, the term "column" refers to a set, list, or array of digital information. In particular, a "column" can refer to a set or list of information that can include a header and corresponding data (e.g., cell data). For instance, a column can include a set or list of information that is represented horizontally (e.g., as a row of data) or vertically with a header that represents the type of information included in the set or list. For example, in one or more embodiments, a column includes a tabular set or list of information that can include a header (e.g., a first cell that is presented as an identifying title) and additional cells that can include data entries (e.g., populated column cells).

As used herein, the term "label" (sometimes referred to as an "annotation") refers to a classification, descriptor, or identifier. For instance, a label can include a descriptor that describes a collection of digital data (e.g., a column or other data construct). In particular, the term "label" can refer to a classification, descriptor, or identifier that classifies content within a list or set of data. For example, for a data column comprising a plurality of dates in different cells, the explanatory annotation system can determine and apply a label of "birthdates" to the data column (e.g., as a classifier or label for the column). In some embodiments, the explanatory annotation system utilizes a plurality of labels in analyzing data, and automatically aligns imported data columns to the corresponding labels within a repository of data. Moreover, in one or more embodiments, the explanatory annotation system can utilize a label as a header and/or schema mapping for a column. A more detailed description of labels and corresponding examples are provided below in relation to the illustrative figures.

As used herein, the term "knowledge graph" refers to a model of digital information that includes interlinking informational nodes or entities. For instance, a knowledge graph includes a collection of data nodes (as entities) that are connected by one or more relational edges. In particular, a "knowledge graph" can refer to a set of column nodes, candidate label nodes, and column feature nodes that are connected (or linked) using a variety of relational edges. Indeed, a knowledge graph can include an embedding of the nodes and relational edges within a latent space that captures relational structures between the nodes. For instance, the explanatory annotation system can utilize deep learning approaches to embed nodes and relational edges within a latent space to learn relational structures between the nodes. Accordingly, a knowledge graph can refer to a learned representation of relational structures between columns, column features, candidate labels, and relational edges within a multi-dimensional space.

As mentioned, a knowledge graph can include a plurality of nodes or entities in a multi-dimensional space. These nodes can also include "neighbor nodes" within this latent space. As used herein, the term "neighbor node" refers to an entity (e.g., a column, column feature, label) within a knowledge graph that is near to another entity (e.g., within a threshold distance of a node, or closer relative to another node) within a knowledge graph. In some embodiments, a neighbor node includes an entity that is connected to another entity via a relational edge within a knowledge graph.

As used herein, the term "relational edge" refers to an edge that defines a relation between entities (or nodes) of a knowledge graph. In particular, a "relational edge" can refer to a type of relation indicated by a connector between entities (or nodes) of a knowledge graph. For example, a relational edge can include a vector or other relational transformation between a node representing a column and another node (e.g., another column, column feature, label) with a defined relation between the nodes. For instance, a relational edge can represent a match between entities, an entity having a column feature, an entity having a keyword, and/or an entity describing (or is described by) a column feature. To illustrate, a relational edge can represent that a column (e.g., as a node) contains a keyword (e.g., a column feature) and an additional relational edge can represent that another column (e.g., as another node) also contains the keyword. As a result, the explanatory annotation system 106 can determine that the column and the other column are connected within the knowledge graph with the relation being that both contain the same keyword (e.g., as the relational edge).

As used herein, the term "latent space" (or latent vector space) refers to a low dimensional space where position or proximity within the space indicates an attribute or characteristic (e.g., proximity indicates a similarity or relationship between two positions). In particular, a "latent space" can refer to a multi-dimensional space that includes vectors (e.g., low dimensional continuous vectors) that characterize various attributes and/or features of columns, column features, relational edges, and candidate labels. For example, a latent vector space can include a multi-dimensional space that includes entities (e.g., nodes of columns, column features, candidate labels) and/or relational edges of a knowledge graph encoded as vectors (or vector embeddings) using deep learning approaches (to capture relational structures between the columns, column features, candidate labels, and relational edges).

As used herein, the term "distance value" refers to a measure of space or proximity between two nodes (or entities) of a knowledge graph. In particular, the term "distance value" can refer to a numerical value that measures a distance between two entities (e.g., nodes of columns, column features, candidate labels) of a knowledge graph (e.g., in a latent vector space that encodes the entities as vectors). For instance, the explanatory annotation system can determine a l-norm value between projected entities of a knowledge graph within a latent vector space. Furthermore, as used herein, the term "cumulative distance score" refers to a plurality of distance values. In particular, a cumulative distance score includes a numerical value representing distance values across two or more relational edges (or between three or more nodes). For example, the explanatory annotation system can determine a cumulative distance score for a path that reflects the distance values for all nodes/relational edges in the path.

Additionally, the term "annotation distance score" can refer to a distance value between a column node (e.g., of an input column) and a label node (e.g., of a determined label) of a knowledge graph within a latent space. Indeed, an annotation distance score can refer to a measure a distance between a column and a label in a latent space to quantify the amount of similarity between the column and the label.

As used herein, the term "column feature" refers to an attribute or characteristic corresponding to a column. In particular, "column feature" can refer to information that defines an attribute or characteristic of a column from a digital dataset. For instance, a column feature can include statistical information corresponding to one or more attributes or characteristics of a column. For example, a column feature can include character-level statistics of one or more specific characters within a column. Additionally, a column feature can include keywords corresponding to a column. For instance, a column feature can include keywords within cells and/or keywords within headers (or labels) of the column. Additional information regarding example column features is discussed below in relation to the figures.

As used herein, the term "path" refers to a sequence of connected nodes and/or relational edges from a starting node to a specific node within a knowledge graph. In particular, a "path" can refer to a sequence of entities (e.g., columns, column features, labels) that connect a starting column to a label within a knowledge graph. For example, a path can include one or more entities (e.g., a column node, one or more neighbor nodes, and a label) that are connected via relational edges in the knowledge graph. Moreover, a path can include a relational edge sequence and/or a cumulative distance score that corresponds to the connections between the sequence of entities from a starting column to a label within a knowledge graph. For example, a path can include a sequence of nodes and a sequence of relational edges (i.e., relational edge sequence) connecting between a column, one or more neighbor nodes, and a label. In addition, the path can also include a corresponding cumulative distance score (e.g., based on distance values between each connecting node).

As used herein, the term "relational edge sequence" refers to a set (or list) of relational edges ordered according to their position in a path. In particular, a "relational edge sequence" can refer to an order of relational edges within a path of entities between a column entity and a label entity. For example, a relational edge sequence can include an ordered list of relational edge relation types between a column entity, one or more neighbor entities (nodes), and a label within a knowledge graph. To illustrate, in a path that includes a first connection between a column and a first neighbor node with a relational edge indicating that both nodes contain a similar keyword, then a second connection between the first neighbor node and a second neighbor node with a relational edge indicating that both of these nodes contain a similar cell-level statistic, then a third connection between the second neighbor node and a candidate label with a relational edge indicating a label match, the explanatory annotation system can determine a relational edge sequence that includes a relational edge that indicates containing similar keyword, a relational edge that indicates containing similar cell-level statistic, and a relational edge that indicates a label match.

As used herein, the term "relational edge sequence pattern" refers to a classification of all or a portion of a relational edge sequence. In particular, a "relational edge sequence pattern" can refer to a specific relational edge sequence that that includes a particular order (e.g., a pattern) of relational edges and/or nodes. For example, a relational edge sequence pattern can be a classification for relational edge sequences that include a similar keyword relational edge, a similar cell-level statistic relational edge, and a matches label relational edge (in that particular order). Moreover, the explanatory annotation system can utilize this relational edge sequence pattern to find paths that possesses the same relational edge sequence pattern.

Furthermore, as used herein, the term "relational edge sequence diversity" refers to differences amongst relational edge sequence patterns corresponding to one or more paths. In particular, a "relational edge sequence diversity" can refer to diverse (or unique) groupings that are determined using relational edge sequence patterns corresponding to paths from a set of paths. For instance, relational edge sequence diversity can include a first subset of paths from a set of paths that correspond to a first relational edge sequence pattern and a second subset of paths from the set of paths that correspond to a second relational edge sequence pattern (e.g., different from the first relational edge sequence pattern).

As used herein, the term "explanatory path" refers to one or more paths selected to describe a relation between a column and a determined label for the column within a knowledge graph. For example, an explanatory path can include one or more paths that represent one or more connections between a column, one or more neighbor nodes, and a determined label for the column within a knowledge graph and the relational edges corresponding to those connections (as a relational edge sequence). Indeed, the explanatory annotation system can rank and select paths to generate an explanatory path in accordance with one or more embodiments herein.

Turning now to the figures, FIG. 1 illustrates a schematic diagram of a system environment 100 (e.g., a "system" 100) in which an explanatory annotation system 106 can operate in accordance with one or more embodiments. As illustrated in FIG. 1, the system 100 includes server device(s) 102, a network 108, and a client device 110. As further illustrated in FIG. 1, the one or more components of the system 100 can communicate with each other via the network 108.

As shown in FIG. 1, the server device(s) 102 can include a variety of types of computing devices, including those described with reference to FIG. 10. The server device(s) 102 can include a digital data analytics system 104 which further includes the explanatory annotation system 106. The digital data analytics system 104 can identify, store, process, receive, utilize, manage, analyze, and/or distribute repositories of digital data. For example, the digital data analytics system 104 can process and/or analyze digital data repositories utilizing various analytical models. To illustrate, the digital data analytics system 104 can utilize neural networks to generate and surface forecasts to client devices, to generate digital visualizations or summaries, and/or to generate and surface digital suggestions to client devices.

Moreover, the explanatory annotation system can receive large digital data volumes (e.g., datasets that include one or more columns) from client device 110 and determine labels with corresponding explanatory paths for the received data. In particular, in some embodiments, the explanatory annotation system 106 identifies columns from datasets (e.g., from user uploaded data and/or data stored by the digital data analytics system 104). Then, the explanatory annotation system 106 can determine labels for the columns using a knowledge graph (e.g., a knowledge graph generated using deep representation learning). Additionally, the explanatory annotation system 106 can generate explanatory paths for the determined labels by ranking and selecting paths identified in the knowledge graph from the columns to the determined labels. Indeed, the explanatory annotation system 106 can provide a determined label for a column and an explanatory path for the label determination to a user (e.g., the client device 110) to further assist accurate label determination and verification of the determination. In addition, the explanatory annotation system 106 can utilize the determined labels to update the datasets associated with the identified columns.

As further shown in FIG. 1, the system 100 can include the client device 110. The client device 110 can modify, create, receive, and/or provide data (e.g., datasets with columns). Moreover, the client device 110 can provide a dataset to the explanatory annotation system 106 (via the server device(s) 102) in order to determine labels for columns in the dataset and/or to include the dataset within a data structure (e.g., for analytics purposes). Furthermore, the client device 110 can receive determined labels in relation to datasets provided by the client device 110 with generated explanatory paths and view/overwrite such determined labels and their corresponding explanatory paths within a label mapping user interface. The client device 110, as illustrated in FIG. 1, can include a variety of types of computing devices, including those explained below with reference to FIG. 10.

Additionally, as shown in FIG. 1, the client device 110 includes a digital content application 112. For example, the digital content application 112 can provide user interfaces and/or tools corresponding to column labels determined by the explanatory annotation system 106. Furthermore, the digital content application 112 can provide options to provide (e.g., upload) and/or retrieve datasets and/or modify label mappings determined by the explanatory annotation system 106. Additionally, the digital content application 112 can also provide user interfaces for viewing explanatory paths corresponding to label determinations for columns of datasets (e.g., explanatory paths generated by the explanatory annotation system 106). Indeed, the digital content application 112 can be a software application (e.g., that implements the explanatory annotation system 106) or a software application hosted on the server device(s) 102. For example, when hosted on the server device(s) 102, the explanatory annotation system 106 can be accessed by the client device 110 through a web browser or an application.

Figure 2:
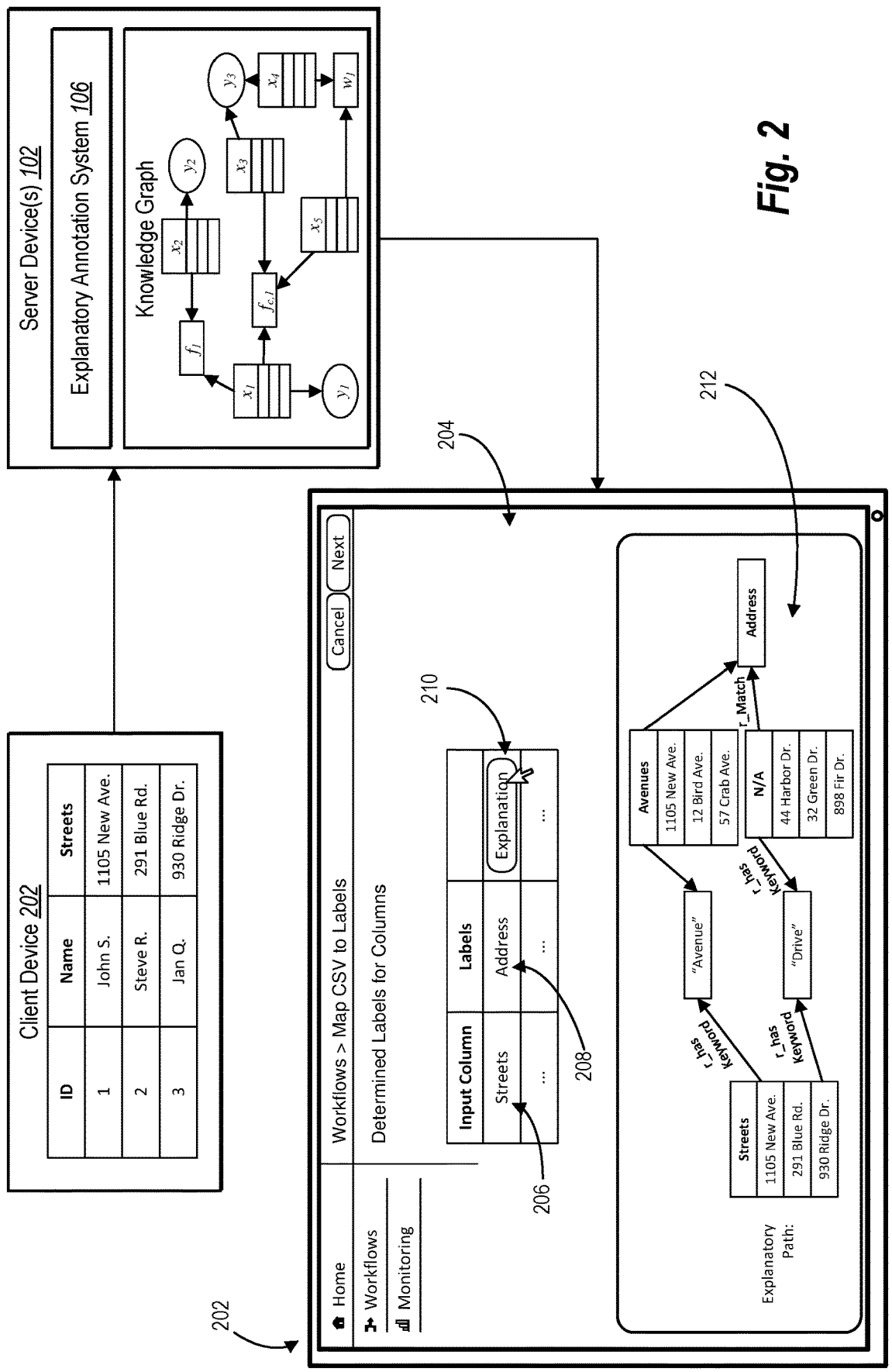
FIG. 2 illustrates a schematic diagram of an explanatory annotation system generating an explanatory path in accordance with one or more embodiments.

Although FIG. 1 illustrates the system 100 with the single client device 110, in one or more embodiments, the system 100 can include additional client devices. For example, the system 100 can include a variety of different numbers of client devices corresponding to users that create, manage, upload, utilize datasets (on the digital data analytics system 104). Furthermore, the system 100 can include multiple client devices that provide separate datasets to the explanatory annotation system 106 for determining labels and generating explanatory paths (as shown in FIG. 2).

Furthermore, although FIG. 1 illustrates the explanatory annotation system 106 implemented on the server device(s) 102, the explanatory annotation system 106 can be implemented, in whole or in part, by other computing devices and/or components in the system 100. For example, the explanatory annotation system 106 can be implemented, in whole or in part, on the client device 110 and can determine labels for columns from datasets and generate explanatory paths for the determined labels on the client device 110. Indeed, in some embodiments, the explanatory annotation system 106 can be implemented as part of the digital content application 112.

Additionally, as shown in FIG. 1, the system 100 includes the network 108. As mentioned above, the network 108 can enable communication between components of the system 100. In one or more embodiments, the network 108 may include a suitable network and may communicate using any communications platform and technology suitable for transporting data and/or communication signals, examples of which are described with reference to FIG. 10. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

As mentioned above, the explanatory annotation system 106 can generate an explanatory path for a determined label from a column in a dataset provided by a client device. For example, FIG. 2 illustrates a client device providing a dataset to the explanatory annotation system 106. As shown in FIG. 2, the client device 202 provides a dataset that includes multiple columns to the server device(s) 102. Indeed, the client device 202 can provide the dataset to the server device(s) 102 in order to integrate the dataset into a data structure and/or to determine (or match) labels to the columns of the dataset (e.g., to match with label mappings in a data structure).

Furthermore, the explanatory annotation system 106 (via the server device(s) 102) can utilize a knowledge graph and the dataset provided by the client device 110 to determine labels for columns of the dataset and also to generate explanatory paths for the determined labels. As shown in FIG. 2, the explanatory annotation system 106 provides both a label match (using a knowledge graph representation generated using deep learning approaches) for the column and explanations for the label determination (i.e., the explanatory path) within a graphical user interface 204. In particular, the explanatory annotation system 106 displays the input column 206 (e.g., "Streets") and the determined label 208 (e.g., "Address") within the graphical user interface 204. In reference to FIG. 2, the explanatory annotation system 106 utilizes a knowledge graph to determine the label 208 (e.g., "Address") for the input column 206 (e.g., with header "Streets") identified from the dataset provided by the client device 202.

In addition, as shown in FIG. 2, the explanatory annotation system 106 can also provide a selectable option 210 (e.g., "Explanation") within the graphical user interface 204. Upon detecting a user interaction (e.g., a cursor click, touch interaction, hover interaction) with the selectable option 210, the explanatory annotation system 106 can display a generated explanatory path 212 (e.g., within a popup window). As shown in FIG. 2, the explanatory annotation system 106 generates the explanatory path 212 to visually represent an explanation of the determined label 208 for the input column 206 in the graphical user interface 204.

As illustrated in FIG. 2, the explanatory annotation system 106 generates the explanatory path 212 to include a first path having a relational edge that indicates that the input column 206 and a neighbor column node in the knowledge graph both have the keyword "Avenue" and that the neighbor column node includes a relational edge that indicates a match with the label "Address." Additionally, as shown in FIG. 2, the explanatory path 212 also includes a second path having a relational edge that indicates that the input column and another neighbor column node in the knowledge graph both have the keyword "Drive" and that the other neighbor column node also includes a relational edge that indicates a match with the determined label 208 (e.g., "Address"). By generating and displaying the explanatory path 212, the explanatory annotation system 106 can provide a visual representation, within a graphical user interface, that explains a column label determination determined using a deep learning approach that does not provide accurate transparency for the process of how labels are determined.

Although one or more embodiments herein describe the explanatory annotation system 106 determining a label and generating an explanatory path for a singular column, the explanatory annotation system 106 can determine labels and generate an explanatory path for a variety of numbers and various types of columns. For example, the explanatory annotation system 106 can identify one or more columns in a dataset and/or from multiple datasets. Furthermore, the identified column or columns can include varying amounts of information (e.g., headers without cell data or cell data without headers).

Additionally, the explanatory annotation system 106 can identify a column in various ways. For instance, the explanatory annotation system 106 can receive a column (or dataset having the column) as input from a client device. Moreover, the explanatory annotation system 106 can identify a column from a dataset stored in a data repository. For instance, the explanatory annotation system 106 can identify columns belonging to a data repository to determine labels and generate explanatory paths for those columns.

Figure 3A:
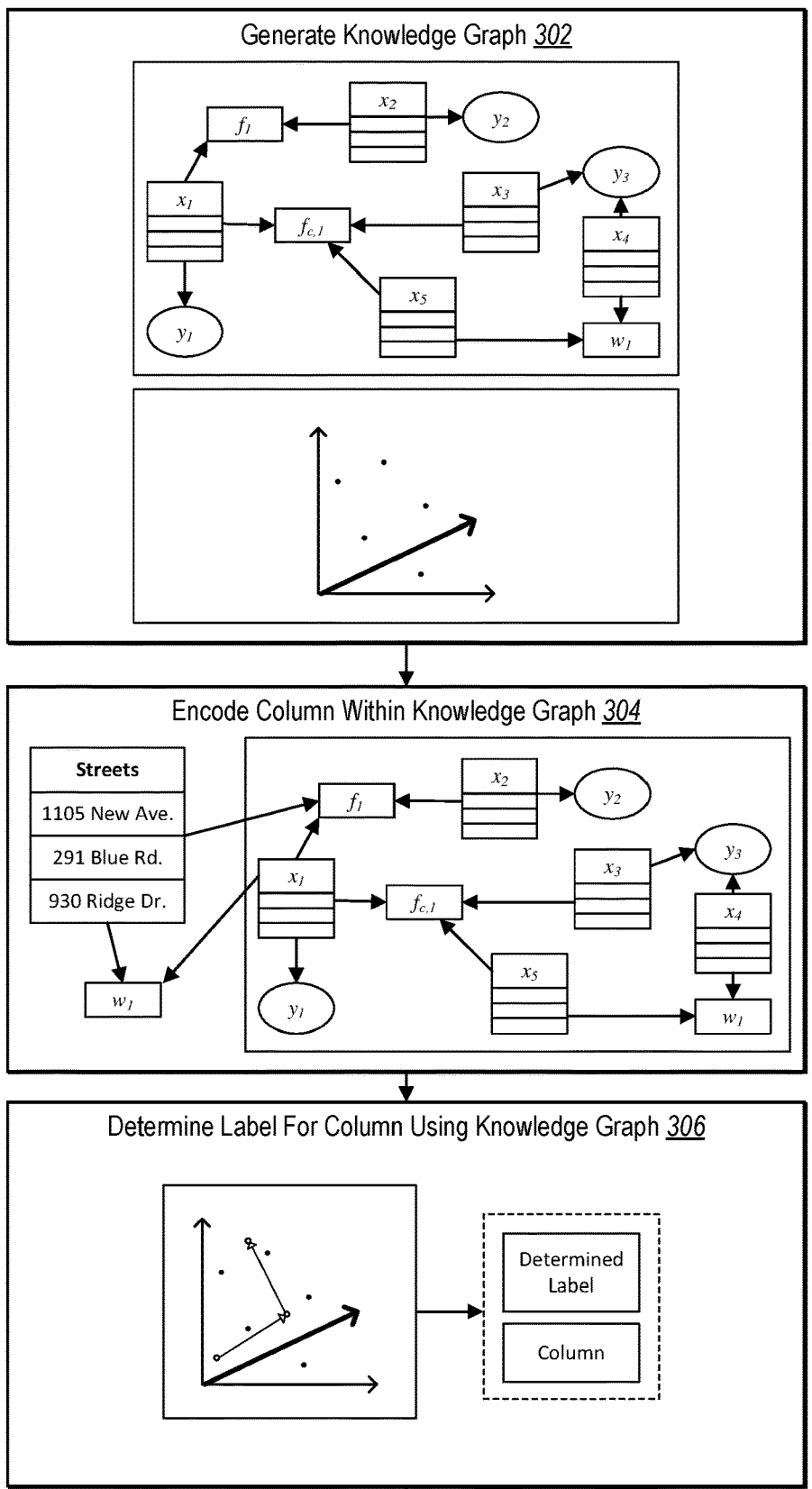
FIGS. 3A and 3B illustrate a flowchart of an explanatory annotation system generating an explanatory path using a knowledge graph in accordance with one or more embodiments.
Figure 3B:
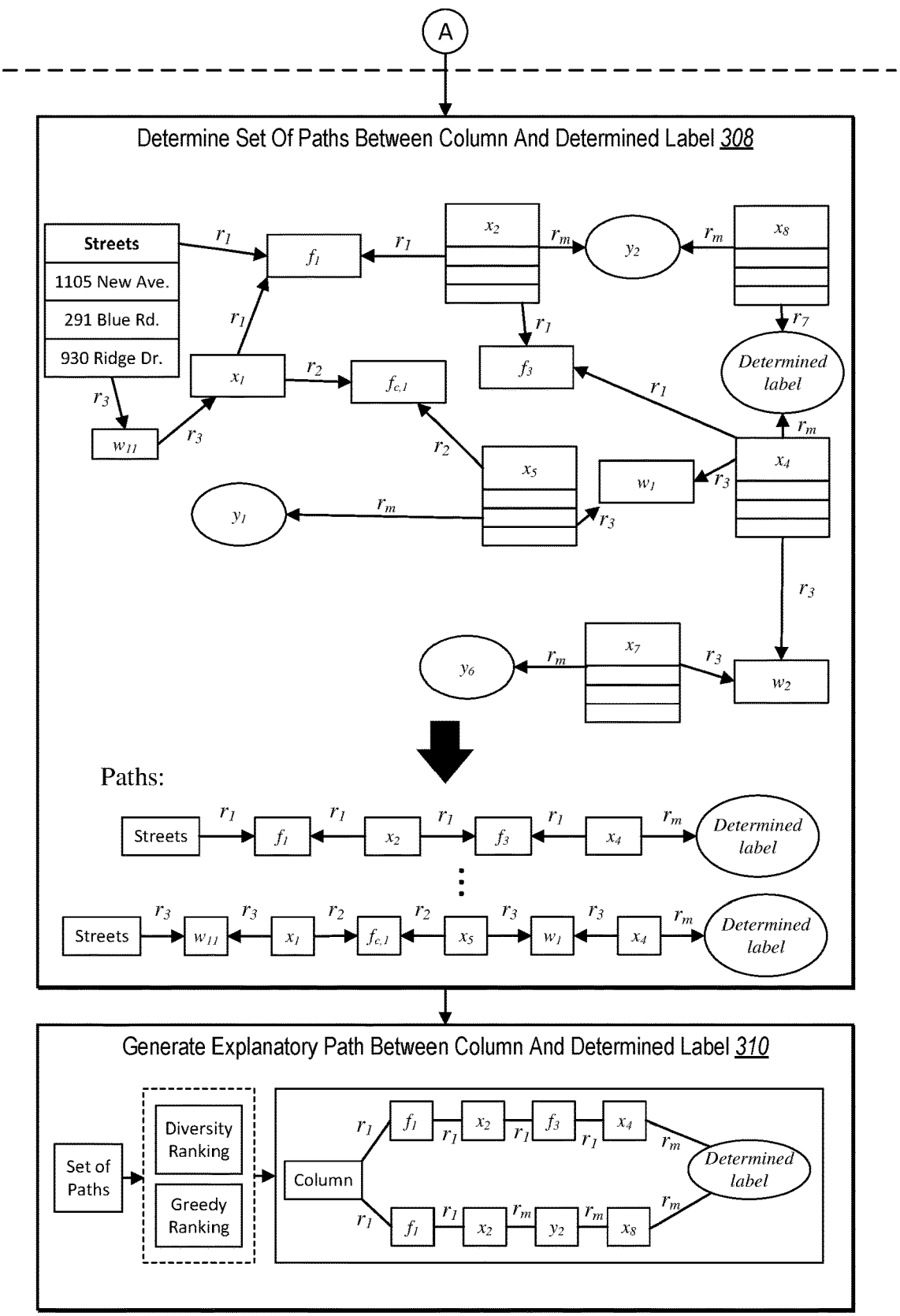

As mentioned above, the explanatory annotation system 106 can generate explanatory paths for column annotations determined using a knowledge graph. For instance, FIGS. 3A and 3B illustrate a flowchart of the explanatory annotation system 106 determining a label for a column and also generating an explanatory path for the determined label. Indeed, FIGS. 3A and 3B illustrate a flowchart of the explanatory annotation system 106 generating a knowledge graph, encoding a column (e.g., provided by a client device) within the knowledge graph, determining a label for the column using the knowledge graph, determining a set of paths between the column and the determined label within the knowledge graph, and generating an explanatory path between the column and the determined label using the set of paths.

For example, as shown in FIG. 3A, the explanatory annotation system 106 generates a knowledge graph in an act 302. As illustrated in FIG. 3A, the explanatory annotation system 106 can encode columns, extracted column features, relational edges, and candidate labels into a knowledge graph in the act 302. Additionally, as shown in FIG. 3A, the explanatory annotation system 106 can generate a knowledge graph utilizing deep representation learning to learn a representation of the knowledge graph in a latent vector space. For instance, generating a knowledge graph is described in detail below (e.g., in relation to FIG. 4).

Furthermore, as shown in FIG. 3A, the explanatory annotation system 106 encodes a column within the knowledge graph in an act 304. For instance, the explanatory annotation system 106 can identify a column from a dataset provided by a client device. Subsequently, the explanatory annotation system 106 can extract column features from the column and encode both the column and column features into the knowledge graph. For example, as shown in FIG. 3A, the explanatory annotation system 106 encodes the column with the header of "Streets" into a knowledge graph. In some embodiments, the explanatory annotation system 106 encodes the column as part of generating the knowledge graph. Specifically, the explanatory annotation system 106 can generate the knowledge graph (at the act 302) by encoding the input column in addition to other columns, extracted column features, relational edges, and candidate labels. Extracting column features and encoding columns and/or column features into a knowledge graph is described in detail below (e.g., in relation to FIGS. 5A and 5B).

In addition, as illustrated in FIG. 3A, the explanatory annotation system 106 determines a label for the column (e.g., provided by the client device) using the knowledge graph in an act 306. Indeed, the explanatory annotation system 106 can determine a label for the column using a latent space representation of the knowledge graph. For instance, as illustrated in FIG. 3A, the explanatory annotation system 106 can determine annotation distance scores between the column and candidate labels within the latent vector space representation of the knowledge graph (e.g., a representation generated using a deep learning approach that is trained to encode entities that are related closer together) to determine a label. Indeed, determining a label using a knowledge graph is described in detail below (e.g., in relation to FIG. 6).

Then, as shown in FIG. 3B, the explanatory annotation system 106 determines a set of paths between the column and the determined label in an act 308. For instance, the explanatory annotation system 106 can utilize a breadth-first-search approach to determine paths between the column and the determined label. In particular, as shown in FIG. 3B, the explanatory annotation system 106 can identify relational edges beginning from the column to the nearest neighbor nodes and eventually identify a relational edge to the determined label within a knowledge graph. Indeed, as also illustrated in FIG. 3B, the explanatory annotation system 106 can determine a set of paths that include paths having one or more entities, one or more relational edges, and labels and corresponding cumulative distance scores for the paths. Determining a set of paths between a column and a determined label is described in detail below (e.g., in relation to FIGS. 7A and 7B).

Moreover, as shown in FIG. 3B, the explanatory annotation system 106 generates an explanatory path between the column and the determined label in an act 310. For instance, the explanatory annotation system 106 generates an explanatory path by ranking and selecting paths from the set of candidate paths (determined at the act 308). Indeed, as shown in FIG. 3B, the explanatory annotation system 106 can rank and select paths using cumulative distance scores (e.g., greedy ranking). In addition, as illustrated in FIG. 3B, the explanatory annotation system 106 can also rank and select paths using cumulative distance scores and relational edge sequence diversities (e.g., diversified ranking). Upon ranking and selecting paths from the set of paths, as shown in FIG. 3B, the explanatory annotation system 106 can generate an explanatory path that represents a relational edge sequence between the column, one or more neighbor nodes from the selected path, and the determined label to explain the label determination. Generating an explanatory path using path ranking and selection is described in detail below (e.g., in relation to FIGS. 7C and 7D).

As mentioned above, the explanatory annotation system 106 can generate a knowledge graph. In particular, the explanatory annotation system 106 can generate a knowledge graph using features extracted from one or more data structures (e.g., information within or associated with one or more datasets having columns). In addition, the explanatory annotation system 106 can use deep representation learning models to learn a representation (e.g., a latent vector space representation) of the relational structure amongst entities of the knowledge graph (e.g., column, label, and column feature entities).

Figure 4:
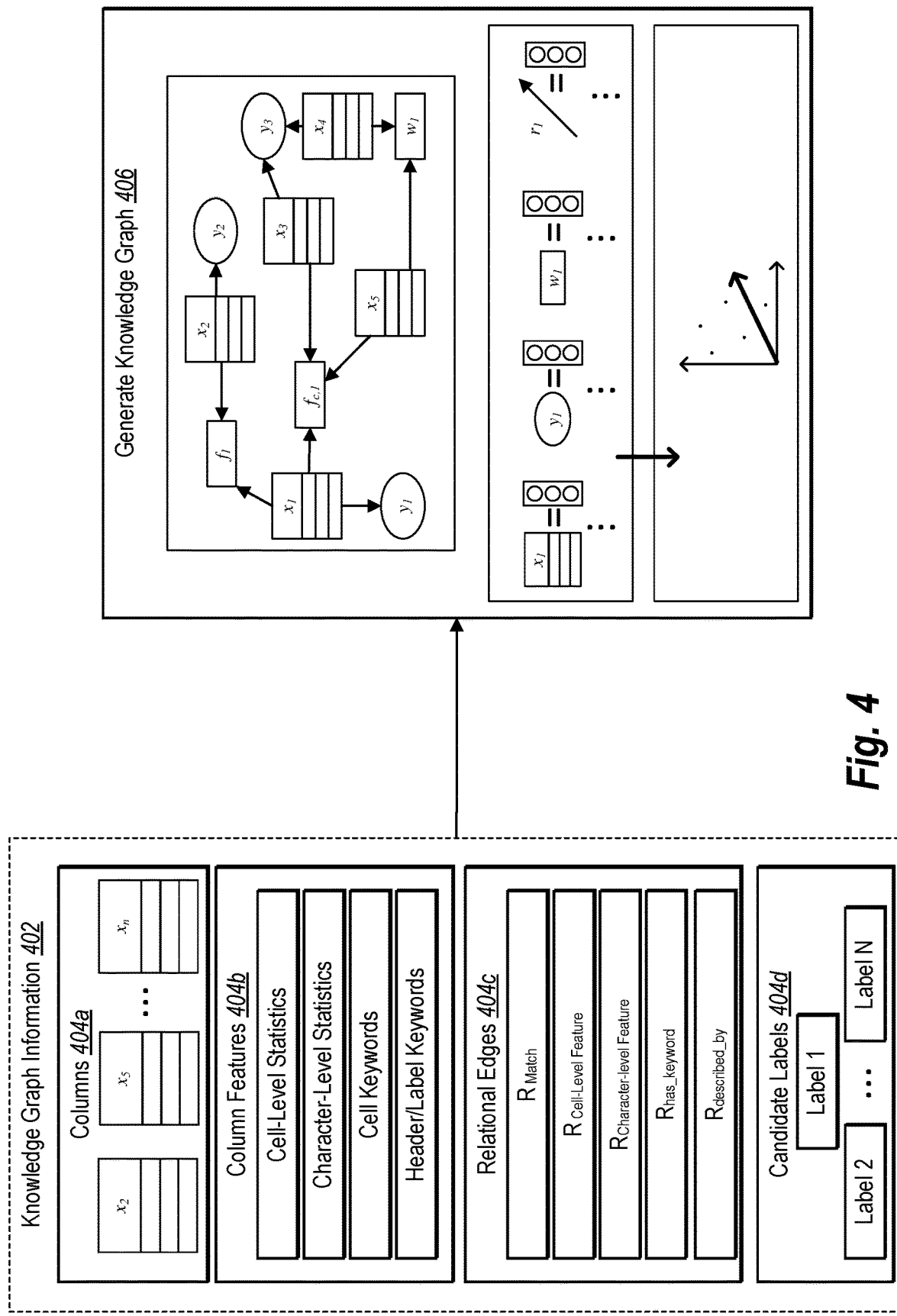
FIG. 4 illustrates a diagram of generating a knowledge graph in accordance with one or more embodiments.

For example, FIG. 4 illustrates the explanatory annotation system 106 generating a knowledge graph using knowledge graph information. Indeed, as shown in FIG. 4, the explanatory annotation system 106 utilizes knowledge graph information 402 to generate a knowledge graph 406. In particular, the explanatory annotation system 106 constructs a knowledge graph using the knowledge graph information and then maps the knowledge graph to a latent space that reflects the relational structure between nodes. As illustrated in FIG. 4, the knowledge graph information 402 includes columns 404a, column features 404b (e.g., extracted from the columns 404a), relational edges 404c, and candidate labels 404d. Furthermore, as shown in FIG. 4, the explanatory annotation system 106 encodes the knowledge graph information 402 into a knowledge graph in the act 406. Indeed, as illustrated in FIG. 4, the explanatory annotation system 106 also utilizes a deep learning approach to learn a representation of the knowledge graph in a latent vector space.

In one or more embodiments, the explanatory annotation system 106 can encode one or more columns within a knowledge graph. For instance, the explanatory annotation system 106 can encode a header and/or one or more cells corresponding to a column within a knowledge graph. Indeed, a column can be encoded as an entity (or node) within a knowledge graph by the explanatory annotation system 106. For example, in some embodiments and as shown in FIG. 4, the explanatory annotation system 106 encodes columns as entities indicated as x nodes within a knowledge graph. Furthermore, the explanatory annotation system 106 can extract column features from columns and encode the column features within a knowledge graph. In particular, the explanatory annotation system 106 can encode a column feature as an entity (or node) within a knowledge graph.

The explanatory annotation system 106 can extract various types of column features to encode within the knowledge graph. For example, as mentioned above, the explanatory annotation system 106 can determine (or extract) statistical information corresponding to attributes or characteristics of a column and/or keywords corresponding to the column. Subsequently, the explanatory annotation system 106 can encode the determined information and/or keywords associated with the column within the knowledge graph. Indeed, the explanatory annotation system 106 can extract a variety of column features for a variety of columns and encode the extracted column features within the knowledge graph.

For instance, in one or more embodiments, the explanatory annotation system 106 extracts cell-level statistics from a column as a column feature. In particular, the explanatory annotation system 106 can analyze one or more cells of a column and extract statistical information corresponding to the one or more cells. For example, in some embodiments, the explanatory annotation system 106 can extract statistical information such as, but not limited to, a number of non-empty cell values, entropy of cell values, ratios corresponding to specific types of cells, statistics corresponding to types of values in cells, statistics of empty cells, statistics of cell value lengths.

Indeed, the explanatory annotation system 106 can identify ratios corresponding to specific types of cells such as, but not limited to, a fraction of unique values, numerical characters, alphabetical characters, special characters, words that are present within one or more cells of a column as cell-level statistics based column features. In addition, the explanatory annotation system 106 can determine statistics such as a mean, median, mode, and/or standard deviation of a number of numerical characters, alphabetical characters, special characters, and/or words that are present within one or more cells of a column as column features. Moreover, the explanatory annotation system 106 can determine statistics of empty cells such as, but not limited to a percentage, count, any, and/or all of the missing values (or cells) in a column as column features. Furthermore, the explanatory annotation system 106 can determine statistics of cell value lengths such as, but not limited to, a sum, minimum, maximum, median, mode, kurtosis, skewness, any, and/or all of the length of cell values in one or more cells of a column as column features.

In one or more embodiments, the explanatory annotation system 106 encodes the column features as bins (or sets) within the knowledge graph. In particular, the explanatory annotation system 106 can bucketize extracted column features into one or more bins (e.g., bins that have a uniform distribution of values). For instance, the explanatory annotation system 106 can generate one or more bins to represent ranges of values (e.g., values corresponding to a cell-level statistic). Then, the explanatory annotation system 106 can encode the bins within the knowledge graph.

In some embodiments, the explanatory annotation system 106 also encodes a relational edge to connect the column feature entity to the corresponding column entity. For instance, the explanatory annotation system 106 can identify (or extract) a cell-level statistic from a column as a column feature and encode the column feature by creating a relational edge that indicates that the column has the cell-level statistical feature (e.g., as a value) that corresponds to an encoded column feature bin that includes the value within the bin's range.

To illustrate, the explanatory annotation system 106 can, for one or more column features, uniformly bucketize the column features into $N_{stat}$ bins such that the number of values in each bin is approximately the same (e.g., to have a uniform distribution). Indeed, the explanatory annotation system 106 can indicate column features as $f_i^{(j)}$ and a number of cell-level statistical features as n for ($1 \le i \le n$, $1 \le j \le N_{stat}$). Specifically, the explanatory annotation system 106 can indicate a cell-level statistical feature $f_i$ to fall within a j-th bin using $f_i^{(j)}$. To illustrate, the column feature $f_i^{(j)}$ indicates a specific cell-level statistical feature that corresponds to a range of values associated with a j-th bin.

Then, when the column feature $f_i^{(j)}$ is extracted from a column x, the explanatory annotation system 106 can create a triple (x, $\mathcal{R}[f_i]$, $f_i^{(j)}$) within a knowledge graph $\mathcal{G}_C$. Indeed, the explanatory annotation system 106 can represent a relational edge as $\mathcal{R}[f_i]$ to indicate that the column x as a head entity (from (x, $\mathcal{R}[f_i]$, $f_i^{(j)}$)) includes a property of the cell-level statistical column feature $f_i$ with a value $f_i^{(j)}$ (e.g., a column feature that is encoded as a tail entity within the knowledge graph). As an illustration, if $f_i$ represents an average number of numerical characters with cells of a column and $f_i^{(j)}$ is an entity encoded within the knowledge graph to represent a range of values [1, 3], then the explanatory annotation system 106 utilizes the triple (x, $\mathcal{R}[f_i]$, $f_i^{(j)}$) to indicate that the average number of numerical characters in the column x is in the range of [1, 3] (e.g., with a relational edge $\mathcal{R}[f_i]$ between the column entity x and the column feature entity $f_i^{(j)}$).

In addition, the explanatory annotation system 106 can extract character-level statistics from a column as a column feature. In particular, the explanatory annotation system 106 can analyze one or more characters of a column and extract statistical information corresponding to one or more characters. For instance, in one or more embodiments, the explanatory annotation system 106 extracts statistical information such as, but not limited to, statistical features for one or more characters in cells of a column (e.g., each of the 96 ASCII-printable characters including digits, letters, and several special characters). Indeed, for a given character c, the explanatory annotation system 106 can identify (or extract) character-level statistics such as, but not limited to, any, all, mean, variance, minimum, maximum, median, sum, kurtosis, and/or skewness of a number of character c in cells of a column as column features.

Moreover, the explanatory annotation system 106 can also encode the character-level statistic based column features as bins (or sets) within the knowledge graph. Indeed, as described above, the explanatory annotation system 106 can bucketize extracted character-level statistic based column features into one or more bins and encode the bins within a knowledge graph. Then, the explanatory annotation system 106 can identify (or extract) a character-level statistic from a column as a column feature and encode the column feature by including a relational edge that indicates that the column has the character-level statistical feature (e.g., as a value) that corresponds to an encoded column feature bin that covers the value within the bin's range.

As an illustration, the explanatory annotation system 106 can, for one or more column features based on character-level statistics, uniformly bucketize the column features into $N_{stat}$ bins such that the number of values in each bin is approximately the same. Moreover, the explanatory annotation system 106 can indicate character-level statistic based column features as $f_{c,i}^{(j)}$ and a number of character-level statistical features as n for ($1 \leq i \leq n$, $1 \leq j \leq N_{stat}$). Indeed, the explanatory annotation system 106 can indicate a character-level statistical feature $f_{c,i}$ to fall within a j-th bin using $f_{c,i}^{(j)}$. For instance, the column feature $f_{c,i}^{(j)}$ indicates a specific character-level statistical feature that corresponds to a range of values associated with a j-th bin.

Furthermore, when the column feature $f_{c,i}^{(j)}$ is extracted from a column x, the explanatory annotation system 106 can create a triple (x, $\mathcal{R}$ [$f_{c,i}$], $f_{c,i}^{(j)}$) within the knowledge graph $\mathcal{G}_C$. The explanatory annotation system 106 can represent a relational edge as $\mathcal{R}$ [$f_{c,i}$] to indicate that the column x as a head entity (from (x, $\mathcal{R}$ [$f_{c,i}$], $f_{c,i}^{(j)}$)) includes a property of the character-level statistical column feature $f_{c,i}$ with a value $f_{c,i}^{(j)}$ (e.g., a column feature that is encoded as a tail entity within the knowledge graph). As an example, if $f_{c,i}$ represents an average number of the character @ (c="@") within cells of a column and $f_{c,i}^{(j)}$ is an entity encoded within the knowledge graph to represent a range of values [0.5, 2.2], then the explanatory annotation system 106 utilizes the triple (x, $\mathcal{R}$ [$f_{c,i}$], $f_{c,i}^{(j)}$) to indicate that the average number of the character @ (c="@") in the column x is in the range of [0.5, 2.2] (e.g., with a relational edge $\mathcal{R}$ [$f_{c,i}$] between the column entity x and the column feature entity $f_{c,i}^{(j)}$).

Moreover, the explanatory annotation system 106 can extract cell keywords from a column as a column feature. In particular, the explanatory annotation system 106 can identify word level features from one or more cells of a column as a column feature. For instance, the explanatory annotation system 106 can identify one or more keywords within one or more cells of a column and encode the keywords as entities within a knowledge graph.

In some embodiments, the explanatory annotation system 106 extracts column features by tokenizing one or more cell values in a column. Then, the explanatory annotation system 106 can aggregate the keywords into unique values to generate a keyword vocabulary $V_{cell}$. Moreover, the explanatory annotation system 106 can encode the unique keyword values in the keyword vocabulary $V_{cell}$ as column features in the knowledge graph. In one or more embodiments, the explanatory annotation system 106 can determine a frequency of each keyword value from the column, in the keyword vocabulary $V_{cell}$. Subsequently, the explanatory annotation system 106 can utilize the frequencies corresponding to the keyword values to select a threshold number of keyword values from the keyword vocabulary $V_{cell}$ based on the frequencies. For instance, the explanatory annotation system 106 can select a threshold number of keyword values from the keyword vocabulary $V_{cell}$ having the highest frequencies. Moreover, the explanatory annotation system 106 can encode the selected keyword values as column features within a knowledge graph.

As an illustration, if a column x includes a keyword w∈$V_{cell}$, the explanatory annotation system 106 can create (or encode) a triple (x, $r_{has\_keyword}$, w) within a knowledge graph $\mathcal{G}_C$. In particular, the explanatory annotation system 106 can utilize the triple (x, $r_{has\_keyword}$, w) to indicate that the column entity x connects to a keyword entity w via a relational edge $r_{has\_keyword}$ from a set of relational edges $\mathcal{R}$. Indeed, the explanatory $\mathcal{G}$ annotation system 106 can identify (or extract) a variety of cell keywords from one or more columns and encode the cell keywords as column features within a knowledge graph (e.g., with a relational edge that connects each specific column to one or more keywords from the column).

In addition, the explanatory annotation system 106 can extract header or label keywords from a column as a column feature. In particular, the explanatory annotation system 106 can identify one or more keywords within a header (or label) corresponding to a column and encode the one or more keywords as entities within a knowledge graph. In some embodiments, as described above, the explanatory annotation system 106 extracts column features by tokenizing one or more values in a header corresponding to a column. As an example, if a column x includes a label y or the header of the column includes a keyword w, the explanatory annotation system 106 can create (or encode) a triple (y, $r_{described\_by}$, w) or a triple (x, $r_{described\_by}$, w) within a knowledge graph $\mathcal{G}_C$. In particular, the explanatory annotation system 106 can utilize the triple (x, $r_{described\_by}$, w) to indicate that the column entity x connects to a keyword entity w via a relational edge $r_{described\_by}$ from a set of relational edges $\mathcal{R}$. Moreover, the explanatory annotation system 106 can utilize the triple (y, $r_{described\_by}$, w) to indicate that a label entity y connects to a keyword entity w via a relational edge $r_{described\_by}$ from a set of relational edges $\mathcal{R}$. Indeed, the explanatory annotation system 106 can identify (or extract) a variety of header and/or label keywords from one or more columns and encode the header and/or label keywords as column features within a knowledge graph (e.g., with a relational edge that connects each specific column to one or more keywords and/or labels from the column).

Furthermore, the explanatory annotation system 106 can encode column and label matches within a knowledge graph. For instance, in one or more embodiments, the explanatory annotation system 106 identifies known matches (i.e., pairings) between candidate labels and known columns. Then, the explanatory annotation system 106 encodes the known column and label matches by using a relational edge between a known column and the known column's matched label within the knowledge graph. Indeed, the explanatory annotation system 106 can utilize known pairings between a variety of different columns and candidate labels (e.g., received or identified from a third party or created using expert annotations) to encode relations between columns and candidate labels within a knowledge graph via relational edges that indicated a match (e.g., relational edge $r_{match}$).

As an example, the explanatory annotation system 106 can utilize the triple (x, $r_{match}$, y) with a knowledge graph $\mathcal{G}_C$ to indicate a relation between a column and a label. More specifically, the as can utilize the triple (x, $r_{match}$, y) to indicate that the column entity x connects to a label entity y (as a match) via a relational edge $r_{match}$ from a set of relational edges $\mathcal{R}$. The explanatory annotation system 106 can encode the triple (x, $r_{match}$, y) within the knowledge graph to indicate the relation between the column entity x and the label entity y.

Indeed, by identifying and encoding the various relations between entities (columns, column features, and/or labels) with relational edges in a knowledge graph, the explanatory annotation system 106 can construct the knowledge graph to represent connections between available entities. As described above, the explanatory annotation system 106 can include various combinations between one or more column entities (e.g., column entities x), column features (e.g., character-level statistic based column features as $f_{c,i}^{(j)}$, cell-level statistical based column features $f_i^{(j)}$, and/or cell or header keywords w), and/or candidate label entities (e.g., candidate label entities y) within a knowledge graph. In addition, the explanatory annotation system 106 can also include other interpretable features within the knowledge graph such as, but not limited to synonyms, data types, integrations of external knowledge bases and relations between these features and the column entities and/or candidate label entities.

Moreover, as mentioned above, the explanatory annotation system 106 can use deep representation learning to generate a representation of a knowledge graph. For instance, the explanatory annotation system 106 can generate a knowledge graph representation that captures relational structures of one or more column entities, one or more column features, and one or more candidate labels within a continuous space. Indeed, the explanatory annotation system 106 can utilize deep representation learning to learn latent vectors for entities and relational edges of a constructed knowledge graph (e.g., via feature extraction) in a low dimensional space (d-dimensional space) such that a head entity (e.g., a column) is near a tail entity (e.g., a feature or a label) within the low dimensional space.

For instance, in one or more embodiments, the explanatory annotation system 106 can learn, for each entity e or relational edge r, a latent vector $e \in \mathbb{R}^d$ or $r \in \mathbb{R}^d$ in a d-dimensional space such that, for each triple (e, r, e')$\in \mathcal{G}_C$, head entity e and tail entity e' are close in latent space with respect to relation (or relational edge) r under distance measure (or value) D(e, r, e'). For instance, the explanatory annotation system 106 can define a translational function that linearly projects an entity e via relational edge r to another entity of the knowledge graph in the d-dimensional space. As an example, the explanatory annotation system 106 can represent a linear projection from an entity e to another entity via a relational edge r using the following translational function ($g_r$):

$$g_r(e) = \text{trans}(e, r) = e + r.$$

Moreover, the explanatory annotation system 106 can determine a distance value between an entity and another entity within a representation of a knowledge graph. For instance, the explanatory annotation system 106 can determine a distance value between a head entity e and a tail entity e' having a relational edge r. For example, the explanatory annotation system 106 can determine a distance value (or measurement) D using a 1-norm between a head entity (e.g., a projected input column entity) e and a tail entity e'. In particular, the explanatory annotation system 106 can define the distance value (or measurement) D using a 1-norm between the entities in accordance with the following:

$$D(e, r, e') = \|g_r(e) - e'\| = \|e + r - e'\|_1.$$

Although the explanatory annotation system 106 in one or more embodiments herein utilizes a 1-norm between entities as a distance value, the explanatory annotation system 106 can utilize a variety of approaches to determine a distance value. For example, the explanatory annotation system 106 can utilize approaches such as, but not limited to, a Euclidean distance and cosine similarities.

Moreover, the explanatory annotation system 106, for each triple (e, r, e')$\in \mathcal{G}_C$, can minimize the distance value D(e, r, e'). For instance, the explanatory annotation system 106 can minimize the distance value D(e, r, e') using a loss function. In particular, the explanatory annotation system 106 can use a max-marginal loss to minimize the distance D(e, r, e') in accordance with the following:

$$\ell_{(e,r,e')} = \Sigma_{(\tilde{e},r,\tilde{e}') \in S_{(e,r,e')}} \max(0, D(e, r, e') + \gamma - D(e, r, e'')).$$

Furthermore, in reference to the above loss function, the explanatory annotation system 106 can utilize a set $S_{(e, r, e')}$ that includes corrupted triples and $\gamma > 0$ is a margin hyperparameter. For instance, the explanatory annotation system 106 can utilize a set $S_{(e, r, e')}$ defined as:

$$S_{(e,r,e')} = \{(\tilde{e}, r, e') | \tilde{e} \in \mathcal{E}\} \cup \{(e, r, \tilde{e}') | \tilde{e}' \in \mathcal{E}\}.$$

In addition, the explanatory annotation system 106 can also include reversed triples within a knowledge graph. As an example, if explanatory annotation system 106 includes a triple (e, r, e')$\in \mathcal{G}_C$, then the explanatory annotation system 106 can also include a reversed triple (e, $r^{-1}$, e')$\in \mathcal{G}_C$. In some embodiments, the explanatory annotation system 106 utilizes reversed triples to guarantee the existence of paths between a column entity and a label entity. Furthermore, the explanatory annotation system 106 can utilize the triples ((e, r, e')$\in \mathcal{G}_C$) and corresponding reversed triples ((e, $r^{-1}$, e')$\in \mathcal{G}_C$) to determine a loss (e.g., to minimize the distance D(e, r, e')). For example, the explanatory annotation system 106 can determine a loss (or error) in accordance with the following:

$$\ell_{(e,r,e')} = \Sigma_{(\tilde{e},r,\tilde{e}') \in \mathcal{G}_C} \ell_{(e,r,e')} + \Sigma_{(e,r^{-1},e') \in \mathcal{G}_C} \ell_{(e,r^{-1},e')}.$$

Moreover, during a training phase, the explanatory annotation system 106 can construct a knowledge graph $\mathcal{G}_C$ with one or more column entities, one or more label entities, one or more column feature entities (e.g., with corresponding relational edges) to train a deep representation learning approach. For example, the explanatory annotation system 106 can construct a knowledge graph similar to transductive setting of semi-supervised learning. Further, the explanatory annotation system 106 can learn a representation of the knowledge graph $\mathcal{G}_C$ (as described above) and optimize the representation of the knowledge graph $\mathcal{G}_C$ using a loss function.

In some embodiments, the explanatory annotation system 106 optimizes the loss $\ell$ (e, r, e') using a stochastic gradient descent over one or more possible triples in the knowledge graph. Indeed, in one or more embodiments, the explanatory annotation system 106 utilizes a loss (e.g., $\ell$ (e, r, e')) between triples (e, r, e') to train a deep representation learning model to ensure that entities of correctly determined entity pairs are closer together in a low dimensional space (based on their vectors) and that entities of incorrect matches are further apart in the low dimensional space. Indeed, in some embodiments, the explanatory annotation system 106 utilizes known correct pairings between entities (e.g., a known labeled column as ground truth data) during a training phase to generate a knowledge graph representation. In some embodiments, the explanatory annotation system 106 further utilizes an Adam optimizer with the loss $\ell$ (e, r, e') during the training phase.

In addition to the approach described above, the explanatory annotation system 106 can utilize various other deep representation learning approaches to learn a representation of a knowledge graph. For instance, the explanatory annotation system 106 can utilize neural networks to generate a representation of a knowledge graph in a continuous space. As an example, the explanatory annotation system 106 can utilize a fully connected and/or a dense neural network to generate a representation of a knowledge graph in a continuous space. Indeed, the explanatory annotation system 106 can utilize a neural network (e.g., a convolutional neural network, sequence-based neural network, dense network, and/or fully convolutional neural network) that can be tuned (e.g., trained) based on inputs to approximate unknown functions. For instance, the explanatory annotation system 106 can utilize a neural network that includes a model of interconnected layers that communicate and analyze attributes at varying degrees of abstraction to learn to approximate functions and generate outputs based on a plurality of inputs provided to the model.

As mentioned above, the explanatory annotation system 106 can extract column features from an identified column. Furthermore, the explanatory annotation system 106 can encode the column features and the column within a knowledge graph. For instance, FIGS. 5A and 5B illustrate the explanatory annotation system 106 extracting column features from a column and encoding the column and the column features (or relational edges to corresponding column features) within a knowledge graph.

Figure 5A:
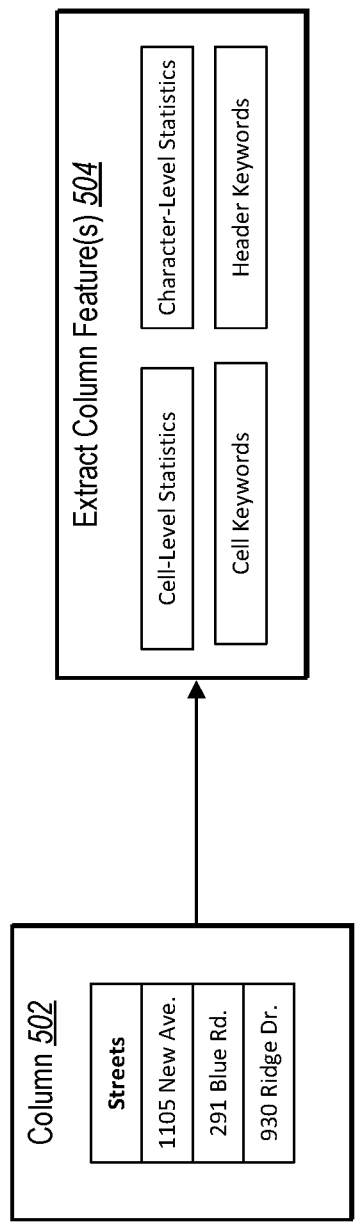
FIGS. 5A and 5B illustrate a diagram of encoding a column within a knowledge graph in accordance with one or more embodiments.

As shown in FIG. 5A, the explanatory annotation system 106 can identify a column 502 (e.g., a column with a header "Streets" and populated column cells). Then, as illustrated in FIG. 5A, the explanatory annotation system 106 can extract column features in an act 504 from the column 502. For instance, as shown in FIG. 5A, the explanatory annotation system 106 can extract column features such as cell-level statistics, character-level statistics, cell keywords, and header keywords from the column 502. Indeed, the explanatory annotation system 106 can extract column features as described above (e.g., in relation to FIG. 4).

Then, the explanatory annotation system 106 can encode a column and corresponding column features within a knowledge graph. In particular, the explanatory annotation system 106 can encode a column and corresponding column features within a knowledge graph by creating connections within the knowledge graph with triples that include the encoded column, a relational edge, and an entity within the knowledge graph (e.g., a column entity, column feature entity, and/or a label). Indeed, the explanatory annotation system 106 can encode the columns, column features, and labels with relational edges in accordance with one or more embodiments herein (e.g., as explained in relation to FIG. 4).

Figure 5B:
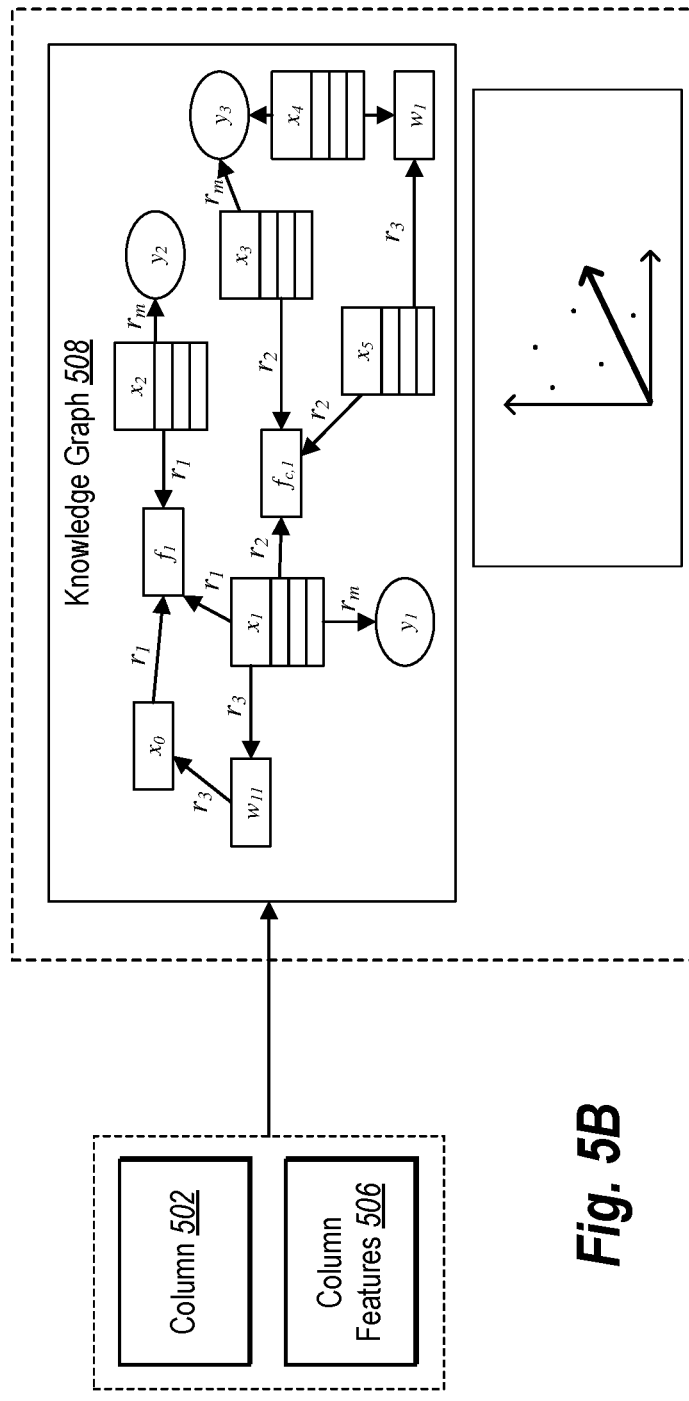

For instance, as shown in FIG. 5B, the explanatory annotation system 106 can encode the column 502 and the corresponding column features 506 (extracted in the act 504) within a knowledge graph to generate a knowledge graph 508. For example, as illustrated in FIG. 5B, the explanatory annotation system 106 can encode the column 502 as an entity $x_0$ within the knowledge graph 508. In addition, the explanatory annotation system 106 can determine relational edges between the column 502 (e.g., entity $x_0$) and column feature entities within the knowledge graph 508 (e.g., column features $f_i$ and $f_{c,i}$).

As an example and as shown in FIG. 5B, the explanatory annotation system 106 can encode the triple ($x_0$, $r_{has\_keyword}$, $w_{11}$) to represent that the column 502 includes the keyword represented by $w_{11}$. Furthermore, as shown in FIG. 5B, by encoding the column 502 and identifying relational edges to extracted column features within the knowledge graph, the explanatory annotation system 106 can also determine that the column 502 (e.g., entity $x_0$) and the column entity $x_1$ are connected (or related) by having a keyword $w_{11}$ (e.g., via the relational edge $r_{has\_keyword}$). Indeed, as shown in FIG. 5B, the explanatory annotation system 106 can determine and include a variety of relational edges between various combinations of entities in a knowledge graph and the input column (e.g., column 502).

In addition, the explanatory annotation system 106 can also learn a representation of the knowledge graph that includes an input column (e.g., column 502). In particular, the explanatory annotation system 106 can encode an input column, column features extracted from the input column, and/or relational edges between the input column and other entities of a knowledge graph into a representation of the knowledge graph (e.g., as shown in FIG. 5B). For instance, the explanatory annotation system 106 can generate a vector embedding for the input column and/or the column features extracted from the input column and encode the vector embedding into a latent vector space corresponding to a learned representation of the knowledge graph. Indeed, the explanatory annotation system 106 can encode a column entity, column feature entity, and/or a label within an existing knowledge graph (generated in accordance with one or more embodiments herein). In some embodiments, the explanatory annotation system 106 generates a knowledge graph using available knowledge graph information (e.g., known columns, column features of known columns, candidate labels) and the input column and column features of the input column.

As mentioned above, the explanatory annotation system 106 can determine a label for a column utilizing a knowledge graph (e.g., a representation of the knowledge graph in vector space). In particular, the explanatory annotation system 106 can determine annotation distance scores between a column (e.g., a column entity) and candidate labels within a knowledge graph. For instance, the explanatory annotation system 106 can determine distance values (or measures) between a vector embedding of a column and one or more vector embeddings of candidate labels within a representation of a knowledge graph. Then, the explanatory annotation system 106 can utilize the determined distance values as annotation distance scores between candidate label vector embeddings and the column vector embedding. Moreover, the explanatory annotation system 106 can determine a label for the column by identifying the column vector embedding and candidate label vector embedding having the lowest annotation distance score (e.g., the column and candidate label that are closest together within the representation of the knowledge graph). For instance, as described above, the explanatory annotation system 106 can determine an annotation distance scores using distance values D(e, r, e') between the column entity e and a tail entity e' that represents a candidate label. In some embodiments, the explanatory annotation system 106 can utilize the distance values D(e, r, e') between the column and candidate labels as the annotation distance scores.

Figure 6:
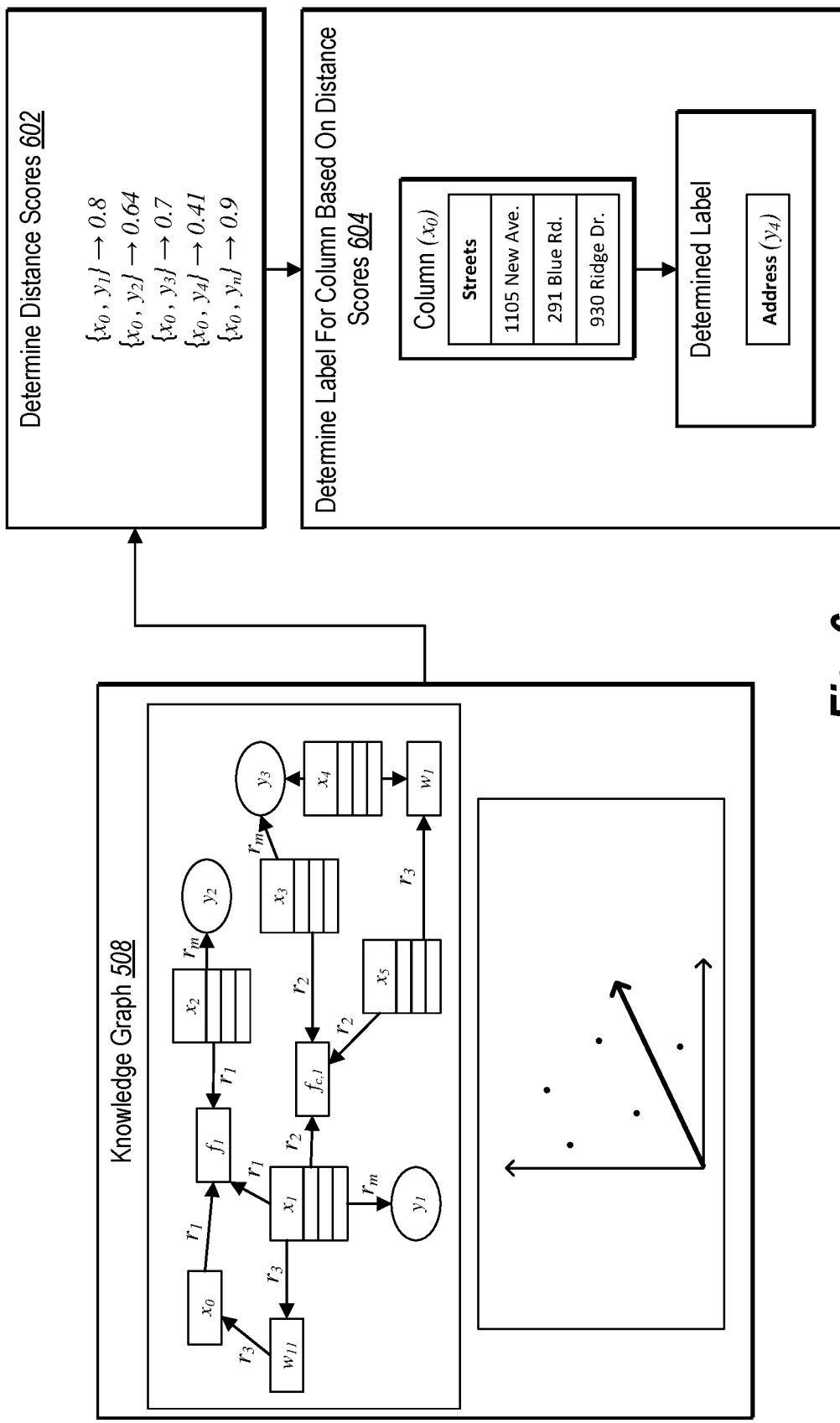
FIG. 6 illustrates a diagram of determining a label for a column utilizing a knowledge graph in accordance with one or more embodiments.

For instance, FIG. 6 illustrates the explanatory annotation system 106 determining a label for a column. As shown in FIG. 6, the explanatory annotation system 106 can determine annotation distance scores between column 502 (e.g., $x_0$) and candidate labels (e.g., candidate labels $y_1, \ldots, y_n$) from within the knowledge graph 508 in an act 602. Then, as illustrated in FIG. 6, the explanatory annotation system 106 can utilize the annotation distance scores from the act 602 to determine a label for the column in an act 604. Indeed, as illustrated in FIG. 6, the explanatory annotation system 106, in the act 604, determines label $y_4$ (e.g., "Address") for the column $x_0$ (e.g., column 502 with header "Streets") based on the annotation distance score between $x_0$ and $y_4$ being the lowest annotation distance score.

To illustrate, the explanatory annotation system 106 can utilize a set of table columns $\mathcal{X}$ in which each column $x \in \mathcal{X}$ includes a header h and a set of cells $C=\{c_1, \ldots c_{|C|}\}$. For example, the explanatory annotation system 106 can represent a value in a single cell as $c_i$ $c_i(\in [|C|])$ for each column x. In addition, the explanatory annotation system 106 can also utilize a universal set of labels $\mathcal{Y}$ in which each column x corresponds to one or more labels $y \in \mathcal{Y}$. For instance, the explanatory annotation system 106 can, given a set of column-label pairs $\{(x, y)\} \subset \mathcal{X} \times \mathcal{Y}$, learn a function (e.g., via a learned representation of a knowledge graph) $f: \mathcal{X} \rightarrow \mathcal{Y}$ that maps a column $x \in \mathcal{X}$ to a label $y \in \mathcal{Y}$. In one or more embodiments, the explanatory annotation system 106 utilizes a finite set of labels $\mathcal{Y}$. By using a finite set of labels $\mathcal{Y}$, the explanatory annotation system 106 can determine one or more labels for a column using multi-way classification.

Then, in an inference phase (e.g., upon training and generating a knowledge graph representation within a continuous space), the explanatory annotation system 106 can determine a label for a new column (e.g., an input column). In particular, the explanatory annotation system 106 can encode the new column as an unpaired column entity x within the knowledge graph (e.g., within the continuous space) in accordance with one or more embodiments herein. Moreover, the explanatory annotation system 106 can determine a label ŷ (as a predicted label) for the unpaired column entity x by finding a triple (x, $r_{match}$, y) (e.g., indicating that the column entity x matches a label y) having the lowest (or minimum) distance in the knowledge graph representation between x and y. For example, the explanatory annotation system 106 can determine a label ŷ (as a predicted label) for the unpaired column entity x using the following function:

$$\hat{y} = \arg \min_{y \in \mathcal{Y}} D(x, r_{match}, y).$$

Although FIG. 6 (and various other figures) illustrate distance scores between 0 and 1, the explanatory annotation system 106 can utilize different ranges of values for distance scores. In addition, the explanatory annotation system 106 can also utilize a variety of ranges of values for distance values (or measures). Furthermore, the explanatory annotation system 106 can encode a variety of number of entities within a knowledge graph and determine distance scores between a variety of combination of the entities encoded within the knowledge graph.

In one or more embodiments, after determining a label for a column, the explanatory annotation system 106 utilizes the determined label as a header for the column. For instance, the explanatory annotation system 106 can replace an existing header of the column with the determined label. Indeed, the explanatory annotation system 106 can utilize keywords and/or text corresponding to the determined label as a header for the column.

As mentioned above, in addition to determining a label for a column, the explanatory annotation system 106 can generate an explanatory path. In particular, the explanatory annotation system 106 can generate an explanatory path for the determined label based on paths between the column and the determined label within a knowledge graph. For instance, the explanatory annotation system 106 can determine a set of candidate paths from the column to the determined label within the knowledge graph. Then, the explanatory annotation system 106 can rank and select one or more candidate paths from the set of candidate paths to generate the explanatory path. Indeed, as previously mentioned, the explanatory annotation system 106 can utilize diversified ranking and/or greedy ranking to rank and select one or more candidate paths from the set of candidate paths to generate an explanatory path between an input column and a determined label for the column.

To illustrate, the explanatory annotation system 106 can generate an explanatory path from a knowledge graph $\mathcal{G}$ with an entity set $\varepsilon$ and a relational edge set $\mathcal{R}$ defined to be a set of triples $\mathcal{G} = \{(e_h, r, e_t) | e_h, e_t \in \varepsilon, r \in \mathcal{R}\}$ in which $e_h$ is a head entity, r is a relational edge, and $e_t$ is a tail entity. Furthermore, the explanatory annotation system 106 can, for a relation between an input column from columns $\mathcal{X}$ and a determined label from labels $\mathcal{Y}$ where $\mathcal{X}$, $\mathcal{Y} \subset \varepsilon$, determine a candidate path within the knowledge graph. For instance, the explanatory annotation system 106 can, using entities $\varepsilon \dagger \{\mathcal{X} \cup \mathcal{Y}\}$ that represent column features that can be extracted from columns (as described above) with relations $R \setminus \{r_{match}\}$ that connect from columns or labels to one or more column feature entities, determine paths between an input column and a determined label.

In particular, the explanatory annotation system 106, for a determined label from a learned representation of the knowledge graph, the explanatory annotation system 106 determines a set of paths each of which start from the input column entity and ending at the determined label entity. Indeed, the explanatory annotation system 106 determines a path L over the knowledge graph $\mathcal{G}_c$ that represents a sequence of entities and relational edges (e.g., L={$e_0$, $r_1$, $e_1$, ..., $e_{|L|-1}$, $r_{|L|}$, $e_{|L|} | (e_{i-1}, r_i, e_i) \in \mathcal{G}_c$, i=1, ..., |L|}). Indeed, in some embodiments, the explanatory annotation system 106 determines a path that satisfies $e_0=x$, $e_{|L|}=y$ and $|L| \geq 2$ for a column x and a determined label y. For instance, the explanatory annotation system 106 can determine, in addition to determine a target label $y \in \mathcal{Y}$ for an unpaired column entity $x \in \mathcal{X}$, m paths {$L_1, \ldots, L_m$} between x and y.

Figure 7A:
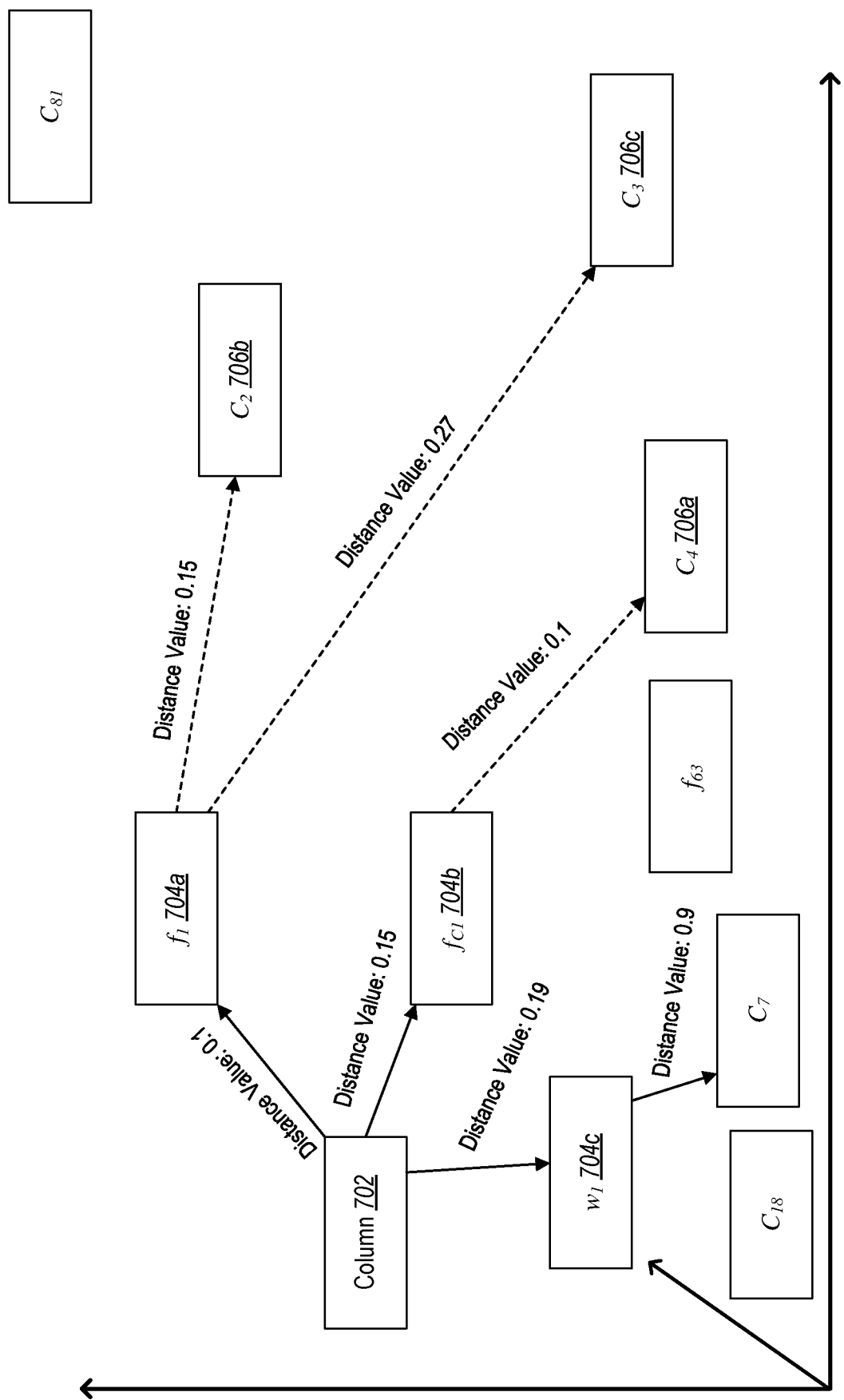
FIGS. 7A-7B illustrate a diagram of determining candidate paths and corresponding cumulative distance scores between a column and a determined label in accordance with one or more embodiments.

For instance, FIG. 7A illustrates the explanatory annotation system 106 exploring connections within a representation of a knowledge graph to determine one or more paths between an input column and a determined label within a knowledge graph. As shown in FIG. 7A, the explanatory annotation system 106 explores connections between a column, one or more neighbor entities (or nodes), and a determined label within a knowledge graph. For example, as illustrated in FIG. 7A, the explanatory annotation system 106 identifies connections between column 702 and a first set of neighbor nodes 704a-704c (e.g., columns). Indeed, as shown in FIG. 7A, the explanatory annotation system 106 determines distance values between the entity of column 702 and other encoded entities within the knowledge graph. Then, as illustrated in FIG. 7A, the explanatory annotation system 106 selects a threshold number of the nearest neighbor nodes (in terms of distance values) to the column 702 as the first set of neighbor nodes 704a-704c.

Furthermore, as illustrated in FIG. 7A, the explanatory annotation system 106 then identifies a second set of neighbor nodes 706a-706c from the first set of neighbor nodes 704a-706c. In particular, the explanatory annotation system 106 identifies connections between the first set of neighbor nodes 704a-706c and the second set of neighbor nodes 706a-706c by selecting a threshold number of nearest neighbor nodes from the first set of neighbor nodes 704a-706c. Indeed, the explanatory annotation system 106 selects a set of nearest neighbor nodes for each node from the first set of neighbor nodes 704a-706c to explore connections between one or more neighbor entities (or nodes) within a knowledge graph. Indeed, the explanatory annotation system 106 can continuously identify nearest neighbor nodes within the knowledge graph until the determined label is connected within the explored path.

In one or more embodiments, the explanatory annotation system 106 utilizes a breadth-first-search (BFS) manner to determine a set of candidate paths between a column and a determined label for the column within a knowledge graph. For instance, the explanatory annotation system 106 can determine a set of $O(\alpha^{K-1})$ candidate paths (i.e., $P^K$) in which each path L corresponds to a cumulative distance score s (i.e., $\{(L, s)\}$) for an input branching factor $\alpha$ and a path length of K. In particular, within a knowledge graph $\mathcal{G}_C$, for an input column x, and a determined label y for the column x, the explanatory annotation system 106 can initialize a path set with scores $P^0 = \{(\{x\}, s_0)\}$ and determine a set of candidate paths $P^K$ using the following function:

for $\forall k = K$ do
  $p^{(k)} = \{\}$
  for $\forall (L, s) \in P^{(k-1)}$ do ▷ $L = \{x, r_1, e_1, \ldots, r_{k-1}, e_{k-1}\}$
  Initialize $Q = \{\}$.
  for $\forall (e_{k-1}, r, e') \in \mathcal{G}_s$ and $e' \notin L$ do
    if $k == K$ and $e' \neq y$ then continue
    $L' = L \cup \{r, e'\}$
    $s' = s + g_r(e_{k-1}, e')$
    $Q = Q \cup \{(L', s')\}$ ▷ s' is key to path L'
  Obtain $\alpha$ paths $\{L'_1, \ldots, L'_\alpha\}$ with the smallest scores $\{s'_1, \ldots, s'_\alpha\}$ from Q.
  $P^{(k)} = P^{(k)} \cup \{(L'_1, s'_1), \ldots, (L'_\alpha, s'_\alpha)\}$
return $P^{(K)}$ Indeed, in reference to the above function, the explanatory annotation system 106 can determine a set of candidate paths $P^{(K)}$ by beginning from a column node x within the knowledge graph and expanding to neighbor nodes of the column node x in a breadth-first-search manner. For instance, the explanatory annotation system 106 considers each neighbor node as e' connecting to column node x with a relational edge r in between. Moreover, the explanatory annotation system 106 can determine a cumulative distance score (e.g., as a heuristic score) using a distance value (as described above) to indicate the distance between a neighbor node and column node x.

Then, in reference to the above equation for determining a set of candidate paths $P^{(K)}$, the explanatory annotation system 106 can select $\alpha$ neighbor nodes with the smallest distance values (or scores) as candidate paths with a length 1 (e.g., k=1). Moreover, the explanatory annotation system 106 can repeatedly (e.g., for K iterations) expand to subsequent neighbor nodes for each candidate path (e.g., from the previous neighbor nodes) using distance values between the subsequent neighbor nodes and the previous neighbor nodes within the knowledge graph. Indeed, the explanatory annotation system 106 can also utilize the distance values between each connecting neighbor node to update a cumulative distance score (e.g., s) for the candidate path. After K iterations, the explanatory annotation system 106 can result in a set of $O(\alpha^{K-1})$ candidate paths.

Furthermore, in reference to the above equation for determining a set of candidate paths $P^{(K)}$, the explanatory annotation system 106 can repeatedly expand to subsequent neighbor nodes (or entities) until the determined label y is identified. Indeed, the explanatory annotation system 106 does not expand to subsequent neighbor nodes in the last K-th iteration because the last node (or entity) in the candidate path is the determined label y. For example, as described above, the explanatory annotation system 106 continues to add neighbor nodes and relational edges with distance values within a candidate path until the determined label y is identified as a subsequent neighbor node within the knowledge graph.

Moreover, the explanatory annotation system 106 determines a cumulative distance score s for each candidate path (e.g., a cumulative distance score s for each candidate path L). In addition, the explanatory annotation system 106 can include, within a candidate path, the column x, one or more neighbor entities e, and a final entity (e.g., label y) with relational edges between each entity (e.g., $L = \{x, r_1, e_1, \ldots, r_{k-1}, e_{k-1}\}$). Indeed, the explanatory annotation system 106 can determine a relational edge sequence from the relational edges in the candidate path that connect the column x to the final entity e. By doing so, the explanatory annotation system 106 determines a set of candidate paths, with corresponding cumulative distance scores, that includes the column x, one or more neighbor nodes, and the determined label y with relational edges between the entities in a knowledge graph.

Although the explanatory annotation system 106 utilizes a breadth-first-search approach in one or more embodiments herein to determine a set of candidate labels, the explanatory annotation system 106 can utilize a variety of path exploration approaches to determine a set of candidate paths. In particular, the explanatory annotation system 106 can determine a set of candidate paths from a column entity x to a determined label y within a knowledge graph using various path exploration approaches that utilize distance values of the entities within the knowledge graph. For instance, the explanatory annotation system 106 can utilize path exploration (or traversal) approach such as, but not limited to, depth-first search.

Figure 7B:
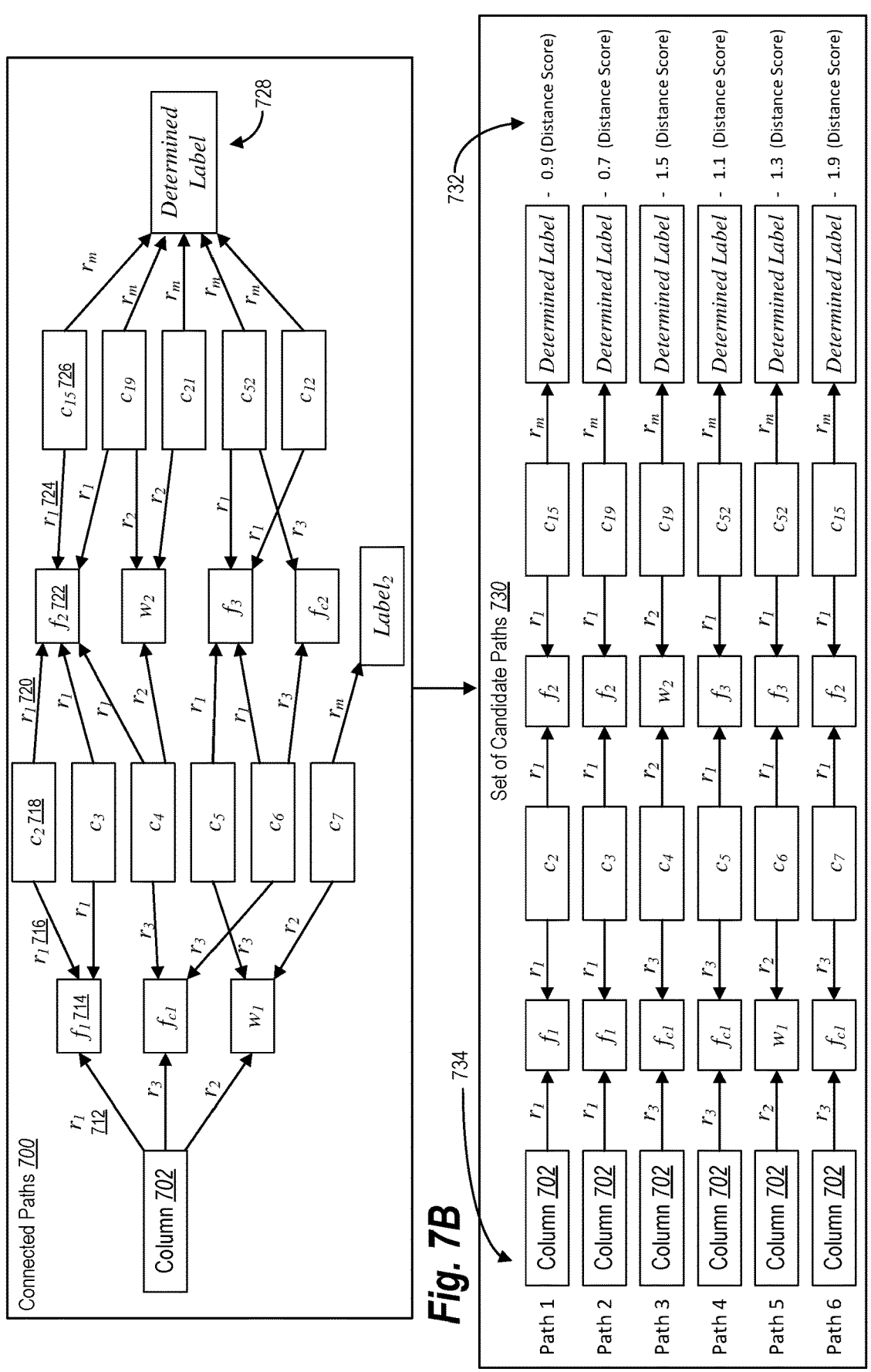

As an example, FIG. 7B illustrates a set of candidate paths within a knowledge graph determined by the explanatory annotation system 106. In particular, as shown in FIG. 7B, the explanatory annotation system 106 can determine a set of candidate paths (e.g., a column, one or more neighbor nodes, and a determined label defined as $L = \{x, r_1, e_1, \ldots, r_{k-1}, e_{k-1}\}$) using a path exploration approach (e.g., BFS) as described above (e.g., in relation to FIG. 7A). Indeed, as shown in FIG. 7B, the explanatory annotation system 106 can determine a candidate path that includes connection (via relational edges) between the column 702, neighbor nodes, and a determined label via various relational edges.

As an illustration and as shown in FIG. 7B, the explanatory annotation system 106 identifies (from the connected paths 700) a first candidate path that includes the column 702, a relational edge 710 and a relational edge 714 (e.g., a relational edge $r_1$ which represents $\mathcal{R}[f_i]$ as described above) to indicate that the column 702 and the column 716 both have a property represented by column feature entity 712 (e.g., $f_1$). In addition, as illustrated in FIG. 7B, the explanatory annotation system 106 identifies that the first candidate path also includes a relational edge 718 and a relational edge 722 (e.g., a relational edge $r_1$ which represents $\mathcal{R}[f_i]$ as described above) to indicate that the column 716 and the column 724 have a property represented column feature entity 720 (e.g., $f_2$). Then, as shown in FIG. 7B, the explanatory annotation system 106 identifies that the first candidate path also includes a relational edge 726 (e.g., a relational edge $r_m$ which represents $r_{match}$ as described above) to indicate that the column 724 matches with the determined label 728.

In addition, the explanatory annotation system 106 can also determine cumulative distance scores s corresponding to the candidate paths L from the set of candidate paths in accordance with one or more embodiments (e.g., $\{(L, s)\}$). For instance, as illustrated in FIG. 7B, the explanatory annotation system 106 determines cumulative distance scores for paths in the set of candidate paths 730 between the column 702 to the determined label 728. For example, the explanatory annotation system 106 determines a cumulative distance score 732 (e.g., 0.9) for the first candidate path 734 in the set of candidate paths 730.

As shown in FIG. 7B, the explanatory annotation system 106 determines a set of candidate paths having various neighbor nodes with various relational edges between the column 702 and the determined label 728. In addition, as shown in FIG. 7B, the explanatory annotation system 106 determines a cumulative distance score for each path (e.g., using distance values between the entities (or nodes) within the path as described above). Indeed, as shown in FIG. 7B, the explanatory annotation system 106 can determine various candidate paths between a column and determined label that include neighbor column entities, column feature entities (e.g., character-level statistic based column features as $f_{c,i}^{(j)}$, cell-level statistical based column features $f_i^{(j)}$, and/or cell or header keywords w), and/or candidate label entities (e.g., candidate label entities y) within a knowledge graph. In addition, as shown in FIG. 7B, the explanatory annotation system 106 can determine the various candidate paths between the column and determined label with various combinations of relational edges (e.g., $\mathcal{R}[f_i]$, $\mathcal{R}[f_{c,i}]$, $r_{has\_keyword}$, $r_{described\_by}$, $r_{match}$ as described above).

As previously mentioned, upon determining a set of candidate paths and corresponding cumulative distance scores for the candidate paths, the explanatory annotation system 106 can rank and select one or more of the candidate paths to generate an explanatory path. Indeed, in one or more embodiments, the explanatory annotation system 106 generates an explanatory path based on cumulative distance scores corresponding to the candidate paths within the set of candidate paths. Furthermore, the explanatory annotation system 106 can utilize greedy ranking to rank and select one or more candidate paths from the set of candidate paths to generate an explanatory path between an input column and a determined label for the column.

Figure 7C:
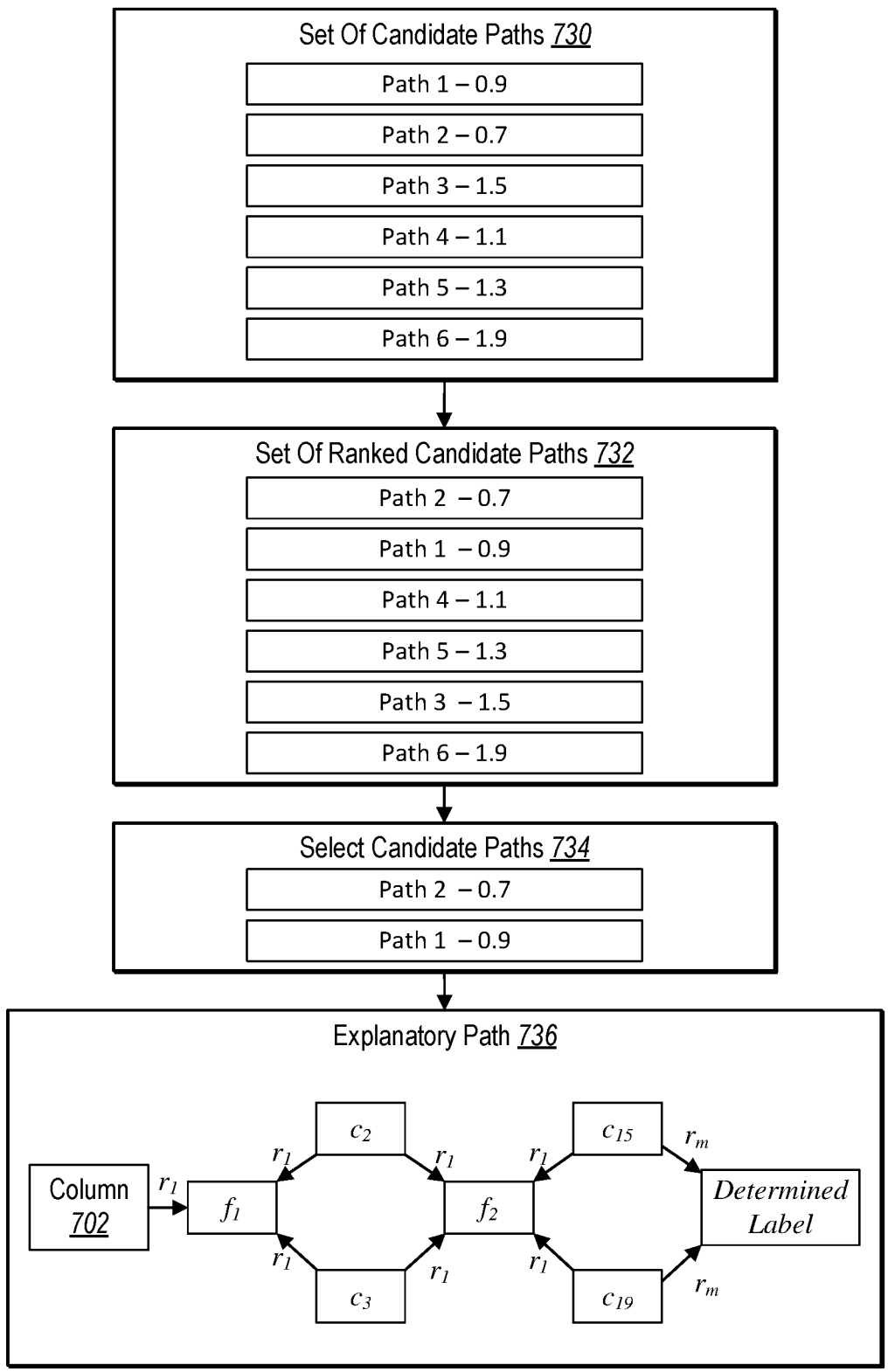
FIG. 7C illustrates a diagram of generating an explanatory path based on cumulative distance scores corresponding to a set of paths in accordance with one or more embodiments.

For instance, FIG. 7C illustrates the explanatory annotation system 106 generating an explanatory path by ranking and selecting candidate paths from a set of candidate paths using a greedy ranking approach. In particular, as shown in FIG. 7C, the explanatory annotation system 106 ranks the set of candidate paths 730 based on cumulative distance scores corresponding to the candidate paths from the set of candidate paths 730. Indeed, as illustrated in FIG. 7C, the explanatory annotation system 106 ranks the candidate paths from a lowest cumulative distance score to a highest cumulative distance score (e.g., a lower cumulative distance score representing that a candidate path includes entities that are closer together within a continuous space of a knowledge graph) to generate a set of ranked candidate paths 736.

Then, as shown in FIG. 7C, the explanatory annotation system 106 selects the top two candidate paths from the set of ranked candidate paths 736 corresponding to the lowest cumulative distance scores in an act 738. In particular, as shown in FIG. 7C, the explanatory annotation system 106 selects the candidate paths corresponding to the cumulative distance scores of 0.7 and 0.9 from the set of ranked candidate paths 736. Subsequently, the explanatory annotation system 106 utilizes the selected candidate paths from the act 738 to generate an explanatory path 740.

Indeed, as shown in FIG. 7C, the explanatory annotation system 106 generates the explanatory path 740 using the selected candidate paths from the act 738 to provide an explanation for the determined column label that demonstrates a reason for the label determination. For instance, the explanatory path 740 generated by the explanatory annotation system 106 demonstrates that the column determination (from the representation of the knowledge graph generated by deep representation learning) is based on the column being connected to the determined label via the relational edges and entities of the selected candidate paths. Although FIG. 7C illustrates the explanatory annotation system 106 selecting the top two candidate paths in the act 738, the explanatory annotation system 106 can select a different threshold number of candidate paths to generate the explanatory path.

Indeed, in one or more embodiments, the explanatory annotation system 106 utilizes a set of candidate paths $P^K = \{(L_i, s_i)\}_{i \in [M]}$ in which $M = O(\alpha^{K-1})$ (e.g., the number of M paths within the set of candidate paths $P^K$). Then, the explanatory annotation system 106 can generate an explanatory path by selecting m paths from the set of candidate paths $P^K$. For instance, the explanatory annotation system 106 can utilize the cumulative distance scores s (i.e., heuristics scores) for each candidate path L in the set of candidate paths $P^K$ to select the m paths to generate the explanatory path. Furthermore, the explanatory annotation system 106 ranks the set of candidate paths $P^K$ in ascending order of cumulative distance scores s in accordance with the following equation:

$$\{L^{(1)}, \ldots L^m | s^1 \leq \ldots \leq s^m \leq s^j, m+1 \leq j \leq M\}.$$

In some embodiments, the explanatory annotation system 106 can also generate an explanatory path utilizing a random selection of candidate paths from the set of candidate paths. In particular, the explanatory annotation system 106 can randomly select a threshold number of candidate paths from the set of candidate paths. Then, the explanatory annotation system 106 can utilize the randomly selected threshold number of candidate paths to generate an explanatory path.

As previously mentioned, the explanatory annotation system 106 can also utilize a diversified ranking approach to rank and select candidate paths from a set of candidate paths to generate an explanatory path between an input column and a determined label for the column. In particular, the explanatory annotation system 106 can generate an explanatory path for a label determination that emphasizes the diversity of paths to provide more informative reasons for the label determination. For instance, the explanatory annotation system 106 can generate an explanatory path from a column to a determined label by selecting one or more candidate paths from a set of candidate paths based on cumulative distance scores and relational edge sequence diversities corresponding to the candidate paths.

Figure 7D:
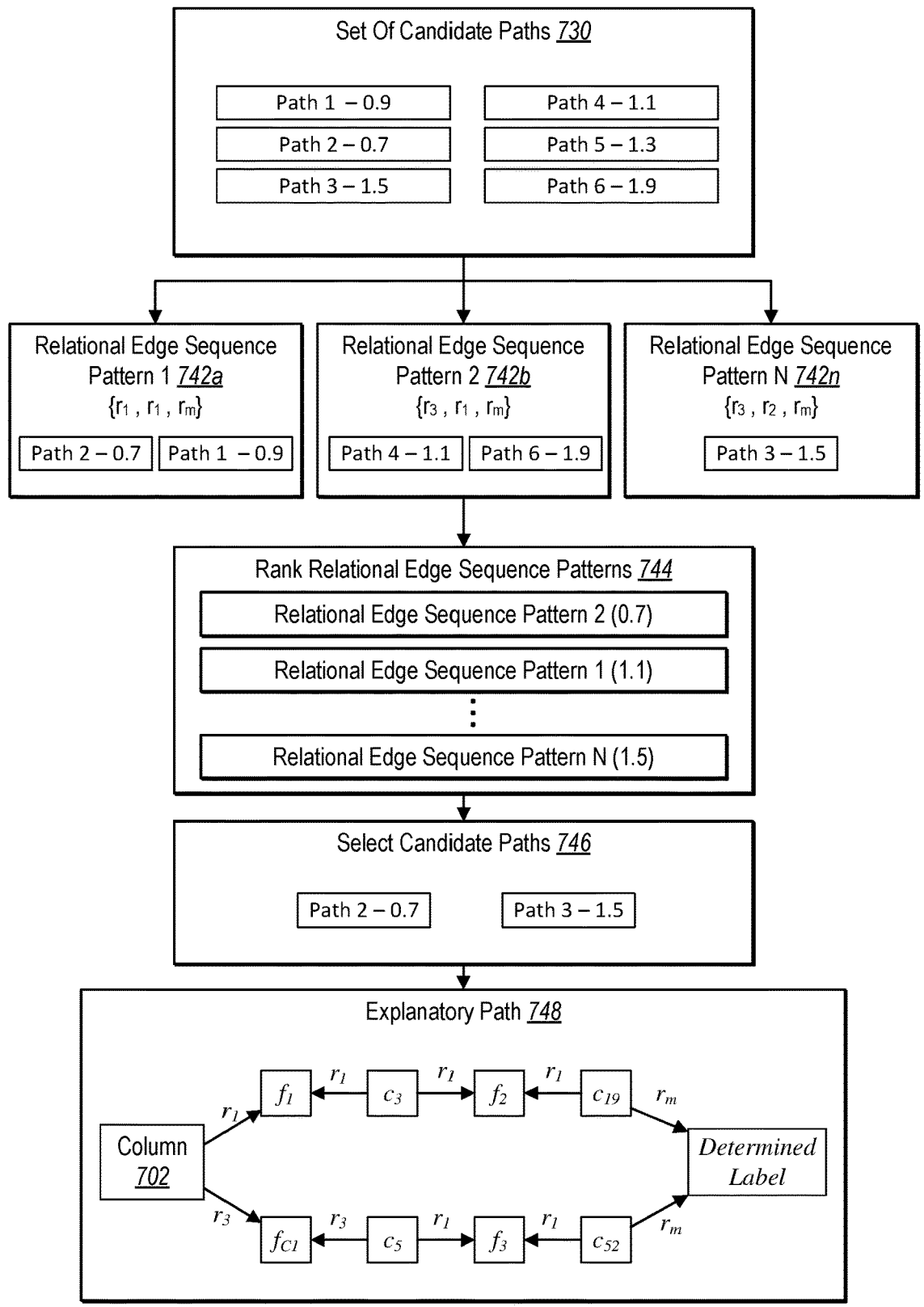
FIG. 7D illustrates a diagram of generating an explanatory path based on cumulative distance scores and relational edge sequence diversities corresponding to a set of paths in accordance with one or more embodiments.

For example, FIG. 7D illustrates the explanatory annotation system 106 generating an explanatory path by selecting one or more candidate paths from a set of candidate paths based on cumulative distance scores and relational edge sequence diversities corresponding to the candidate paths. Specifically, as shown in FIG. 7D, the explanatory annotation system 106 identifies paths of particular relational edge sequence patterns 742a-742n (e.g., unique relational edge sequence patterns) from the set of candidate paths 730 based on the relational edge sequences corresponding to the individual candidate paths. Moreover, as illustrated in FIG. 7D, the explanatory annotation system 106 groups candidate paths with a particular relational edge sequence within a relational edge sequence pattern.

Moreover, the explanatory annotation system 106 can utilize the one or more relational edge sequence patterns to determine subsets of paths. For example, as shown in FIG. 7D, the explanatory annotation system 106 identifies a first subset of candidate paths having the first relational edge sequence pattern 742a (e.g., a relational edge sequence pattern of $\{r_1, r_3, r_1, r_m\}$). For instance, in reference to FIG. 7D, the explanatory annotation system 106 can determine a relational edge sequence of $\{r_1, r_3, r_1, r_m\}$ for a candidate path L=$\{x, r_1, e_1, r_1, e_2, r_3, e_3, r_3, e_4, r_1, e_6, r_1, e_6, r_m, y\}$ between a column x, neighbor nodes $e_i$, and the determined label y. Likewise, as illustrated in FIG. 7D, the explanatory annotation system 106 identifies other subsets of candidate paths that corresponds to the relational edge sequence patterns 742a-742n. By doing so, the explanatory annotation system 106 can create one or more subsets candidate paths having particular relational edge sequence patterns. Indeed, the explanatory annotation system 106 can determine a relational edge sequence for each candidate path from a set of candidate paths.

Moreover, as illustrated in FIG. 7D, the explanatory annotation system 106 ranks the relational edge sequence patterns in an act 744 based on cumulative distance scores corresponding to candidate paths. More specifically, as shown in FIG. 7D, the explanatory annotation system 106 ranks paths within the relational edge sequence patterns in ascending order based on cumulative distance scores. Then, as illustrated in FIG. 7D, the explanatory annotation system 106 utilizes the lowest cumulative distance score corresponding to each relational edge sequence pattern 742a-742n to rank relational edge sequence patterns in the act 744. In particular, the explanatory annotation system 106 ranks the relational edge sequence patterns 742a742n in ascending order based on the lowest cumulative distance score associated with each pattern. For instance, as illustrated in FIG. 7D, the explanatory annotation system 106 ranks the second relational edge sequence pattern 742b as the highest relational edge sequence pattern because the second relational edge sequence pattern 742b is associated with the lowest cumulative distance score from the paths of the set of candidate paths 730.

In addition, as shown in FIG. 7D, the explanatory annotation system 106 selects paths from the ranked relational edge sequence patterns in an act 746 to generate an explanatory path. For instance, as shown in FIG. 7D, the explanatory annotation system 106 selects candidate paths from the top two ranked subsets of the relational edge sequence patterns in the act 746. Indeed, as shown in FIG. 7D, the explanatory annotation system 106 selects a first candidate path corresponding to the lowest cumulative distance score from the highest ranked relational edge sequence pattern and a second candidate path corresponding to the lowest cumulative distance score from the second highest ranked relational candidate path. Then, the explanatory annotation system 106 utilizes the selected first and second candidate paths to generate the explanatory path 748. As shown in FIG. 7D, by using diversified ranking, the explanatory annotation system 106 generates an explanatory path that provides a diverse explanation for a column label determination.

As described above, the explanatory annotation system 106 can determine, from relational edge sequences corresponding to candidate paths from a set of candidate paths, one or more relational edge sequence patterns. In addition, the explanatory annotation system 106 can also utilize a variety of other features corresponding to paths to determine relational edge sequence patterns. For example, the explanatory annotation system 106 can utilize features such as, but not limited to, length of paths, frequencies of nodes and/or relational edges, node types, and/or relational edge types to determine a relational edge sequence pattern. Indeed, the explanatory annotation system 106 can utilize various combinations of path features to determine unique relational edge sequence patterns.

Additionally, the explanatory annotation system 106 can select a variety of candidate paths from between separate relational edge sequence patterns based on ranks associated with the relational edge sequence patterns. In some embodiments, the explanatory annotation system 106 selects candidate paths corresponding to the lowest cumulative distance score from within each of the available relational edge sequence patterns. Furthermore, in one or more embodiments, the explanatory annotation system 106 selects a threshold number of candidate paths from the subsets of candidate paths corresponding to the relational edge sequence patterns. For instance, the explanatory annotation system 106 can select candidate paths corresponding to the lowest cumulative distance score from within each of the relational edge sequence patterns until the threshold number of candidate paths are selected. In some embodiments, the explanatory annotation system 106 selects candidate paths from a portion of the relational edge sequence patterns when the threshold number of candidate paths is less than the available number of unique relational edge sequence patterns.

Moreover, the explanatory annotation system 106 can select multiple candidate paths from a relational edge sequence pattern. For instance, when the threshold number of candidate paths to be selected is greater than the available number of unique relational edge sequence patterns, the explanatory annotation system 106 can repeatedly select candidate paths starting from the highest ranked relational edge sequence pattern. In particular, the explanatory annotation system 106 can select a candidate path corresponding to a second lowest cumulative distance score from a relational edge sequence pattern after the explanatory annotation system 106 has selected the candidate paths corresponding to the lower cumulative distance score from each of the relational edge sequence patterns.

Additionally, the explanatory annotation system 106 can utilize the selected candidate paths from the various relational edge sequence patterns to generate an explanatory path. In particular, the explanatory annotation system 106 can utilize the selected candidate paths based on the relational edge sequence diversities (e.g., using the relational edge sequence patterns) to generate an explanatory path that demonstrates a diverse reason for the column label determination. Indeed, by utilizing relational edge sequence diversities in accordance with one or more embodiments to rank and select candidate paths, the explanatory annotation system 106 can generate an explanatory path that provides multiple and diverse explanations in regard to why a deep learning model determines a specific column label for a column.

To illustrate, in one or more embodiments, the explanatory annotation system 106 can determine a subset of paths $\hat{P}$ to utilize in an explanatory path. For instance, for a given K-hop path L={$e_0, r_1, e_1, \ldots, r_K, e_K$}, the explanatory annotation system 106 determines a relational edge sequence pattern $\pi(L)=\{r_1, \ldots, r_K\}$. In addition, the explanatory annotation system 106 can, using a set of candidate paths $P^K$ having M candidate paths and a corresponding relational edge sequence pattern $\pi(L)$ to determine a subset of paths $\hat{P}$ for an explanatory path. In particular, given a threshold number of candidate labels to select m, the explanatory annotation system 106 determines a subset of m paths $\hat{P}$ by first determining unique relational edge sequence patterns among the M candidate paths to obtain $\Pi=\{\pi_1, \ldots, \pi_{m'}\}$ in which m' is the number of unique relational edge sequence patterns.

Subsequently, the explanatory annotation system 106 can determine the subsets of paths for each relational edge sequence pattern using the following function:

$$P(\pi_i)=\{(L_i^{(j)},s_i^{(j)})|(L_i^{(j)},s_i^{(j)})\in P^K, \pi(L_i^{(j)})=\pi_i, s_i^{(j)} \leq s_i^{(j+1)}\}, \text{ for } i=1,\ldots,m'.$$

In addition, the explanatory annotation system 106 can rank the relational edge sequence patterns $\pi_i \in \Pi$ using the following function:

$$\text{rank}(\pi_i) < \text{rank}(\pi_j) \text{ if } \min_{s \in P(\pi_i)}(s) < \min_{s \in P(\pi_j)}(s).$$

Furthermore, the explanatory annotation system 106 can determine the subset of m paths $\hat{P}$ using the following function:

$$\hat{P}=\{\hat{L}^{(k)}\}_{k \in [m]} \text{ such that } \hat{L}^{(k)}=L_a^{(b)}, a=\lfloor k/m' \rfloor, b=k \bmod m', 1 \leq k \leq m.$$

In addition to utilizing diversified ranking to generate an explanatory path between a column and a determined label for the column, the explanatory annotation system 106 can also determine a diversity score (or metric) for the set of candidate paths to measure a diversity of explanation (e.g., a diversity between the candidate paths in the set of candidate paths). For instance, the explanatory annotation system 106 can utilize frequencies associated with unique relational edge sequence patterns within the set of candidate paths to determine a diversity score. In one or more embodiments, the explanatory annotation system 106, for m' unique relational edge sequence patterns (m'≤m) with corresponding frequencies $n_1, \ldots, n_{m'}$ ($n_i \in \mathbb{N}^+, \Sigma_i n_i = m$), determines a diversity of explanation P using the function:

$$div(P) = -\sum_{k=1}^{m'} \frac{n_i}{\sum_j n_j} \log \frac{n_i}{\sum_j n_j}.$$

Indeed, the explanatory annotation system 106 utilizes the above function to determine a diversity of explanation as a Shannon entropy (e.g., if the occurrence of the relational edge sequence pattern is regarded as a random variable). Moreover, the explanatory annotation system 106 can determine that a set of candidate paths is more diverse if div(P) is higher and can determine that the set of candidate paths is less diverse if div(P) is lower. In one or more embodiments, the explanatory annotation system 106 provides the determined diversity of explanation P with the explanatory paths to indicate the measure of diversity.

As previously mentioned, the explanatory annotation system 106 can utilize ranked and selected candidate paths (e.g., via greedy ranking and/or diversified ranking) to generate an explanatory path. Indeed, the explanatory annotation system 106 can utilize the selected candidate paths (e.g., the column entity, one or more neighbor entities (or nodes), the determined label, and one or more relational edges between the entities of the knowledge graph) to generate an explanatory path for display in a graphical user interface. For instance, the explanatory annotation system 106 can generate a visual mapping of one or more selected paths to represent connections (via relational edges) between the column, one or more neighbor entities, and the determined label to explain the column label determination (as described above).

As mentioned above, the explanatory annotation system 106 can generate an explanatory path that provides an accurate explanation for a column label determination while also providing an accurate column label determination. For instance, experimenters applied an embodiment of the explanatory annotation system 106 to two open source datasets and two real-world industrial datasets. Indeed, the experimenters applied the embodiments of the explanatory annotation system 106 to determine the column annotation performance of the explanatory annotation system 106 and to determine the accuracy and effectiveness of the explanatory paths to explain the column label determinations.

In particular, the experimenters utilized two real-world data sets, WWT which contains over 27,000 columns and about 460,000 rows and Retailer which contains 3,300 columns and 33 unique annotations with each column having thousands of values of mixed data types. The datasets were randomly split into 60% for training, 20% for validation, and 20% for testing. The random split on the datasets were performed five times and an average performance of various column annotation methods (including an embodiment of the explanatory annotation system 106) was obtained amongst the five randomly split tests.

During the experiment, three categories of methods were utilized (e.g., rule-based, machine learning, and deep learning techniques). For example, the rule-based method included an implementation of Dictionary. Additionally, the machine learning approaches included a Decision Tree and a Random Forest model. Furthermore, the deep learning techniques included Sherlock (e.g., Sherlock-27d and Sherlock-987d). Indeed, the experimenters utilized the above methods in addition to an embodiment of the explanatory annotation system 106 to annotate (or determine) column labels for columns in these datasets (e.g., over five random splits). As shown in Table 1 below, the explanatory annotation system 106 provided superior performance over the baseline methods on both datasets by determining more accurate column annotations for columns.

TABLE 1

| Dataset: | WWT F1 Score | Retailer F1 Score |
|---|---|---|
| Dictionary | 0.2470 ± 0.0034 | 0.3741 ± 0.0240 |
| Decision Tree | 0.3265 ± 0.0192 | 0.8102 ± 0.260 |
| Random Forest | 0.3388 ± 0.0126 | 0.8105 ± 0.0091 |
| Sherlock-27d | 0.2010 ± 0.0094 | 0.7604 ± 0.0093 |
| Sherlock-987d | 0.3439 ± 0.0224 | 0.7869 ± 0.0170 |
| Explanatory Annotation System | 0.3653 ± 0.0115 | 0.8281 ± 0.0050 |

In addition, the experimenters utilized two data sets, WebTable78 which contains 10 disjoint datasets with each containing approximately 16,000 columns annotated by 78 classes (i.e., labels) and Marketing which contains 4,800 columns with 81 unique labels. The datasets were again randomly split into 60% for training, 20% for validation, and 20% for testing. The random split on the datasets were performed five times and an average performance of various column annotation methods (including an embodiment of the explanatory annotation system 106) was obtained amongst the five randomly split tests. The experimenters utilized the above mentioned methods in addition to an embodiment of the explanatory annotation system 106 to annotate (or determine) column labels for columns in these datasets for cell-only data from these two datasets (e.g., over five random splits). As shown in Table 2 below, the explanatory annotation system 106 provided comparable performance over the baseline methods on WebTable78 dataset and superior performance over the baseline methods on the Marketing dataset.

TABLE 2

| Dataset: | WebTable78 F1 Score | Marketing F1 Score |
|---|---|---|
| Dictionary | 0.4268 ± 0.0045 | 0.5362 ± 0.0156 |
| Decision Tree | 0.5118 ± 0.0090 | 0.7116 ± 0.0105 |
| Random Forest | 0.5123 ± 0.0170 | 0.7226 ± 0.0099 |
| Sherlock-27d | 0.3318 ± 0.0114 | 0.6589 ± 0.0112 |
| Sherlock-987d | 0.5023 ± 0.0108 | 0.7218 ± 0.0058 |
| Explanatory Annotation System | 0.5082 ± 0.0045 | 0.7477 ± 0.0139 |

Additionally, the experimenters conducted a user study to evaluate the accuracy of explanations for column label determinations. In the user study, the experimenters presented explanatory paths generated by an embodiment of the explanatory annotation system 106 for correctly predicted label determinations from the explanatory annotation system 106 on the datasets described above (e.g., WWT, Retailer, WebTable78, and Marketing). In the study, the participants reviewed the explanatory paths generated by the explanatory annotation system 106 (e.g., using random selection, greedy ranking, diversified ranking) for column annotations for columns corresponding to these datasets. In the review, the participants indicated an evaluation of the explainability of the explanatory paths using a 5-point Likert scale. Indeed, as shown in Table 3 below, the explanatory annotation system 106 provided a superior explainability via the participant evaluation ratings when generating explanatory paths using greedy and diversified ranking.

TABLE 3

| Algorithms: | Random | Greedy | D-Rank |
|---|---|---|---|
| WWT | 1.733 ± 1.215 | 2.827 ± 1.603 | 2.267 ± 1.578 |
| Retailer | 2.293 ± 1.556 | 3.880 ± 1.414 | 3.227 ± 1.519 |

TABLE 3-continued

| Algorithms: | Random | Greedy | D-Rank |
|---|---|---|---|
| WebTable78 | 1.380 ± 0.629 | 2.840 ± 1.239 | 2.340 ± 1.210 |
| Marketing | 2.540 ± 1.299 | 2.120 ± 0.863 | 2.180 ± 0.931 |
| Overall | 2.083 ± 1.215 | 2.857 ± 1.215 | 2.490 ± 1.215 |

Accordingly, the explanatory annotation system 106 can generate an explanatory path that provides an accurate explanation for a column label determination while also providing an accurate column label determination. Indeed, as shown in the experimental results above, the explanatory annotation system 106 performs column label annotations (or determinations) for columns as well or better than other methods (e.g., deep learning techniques). In addition, as shown by the experimental results above, the explanatory annotation system 106 also provides explanatory paths that accurately explain the column label determinations.

Figure 8:
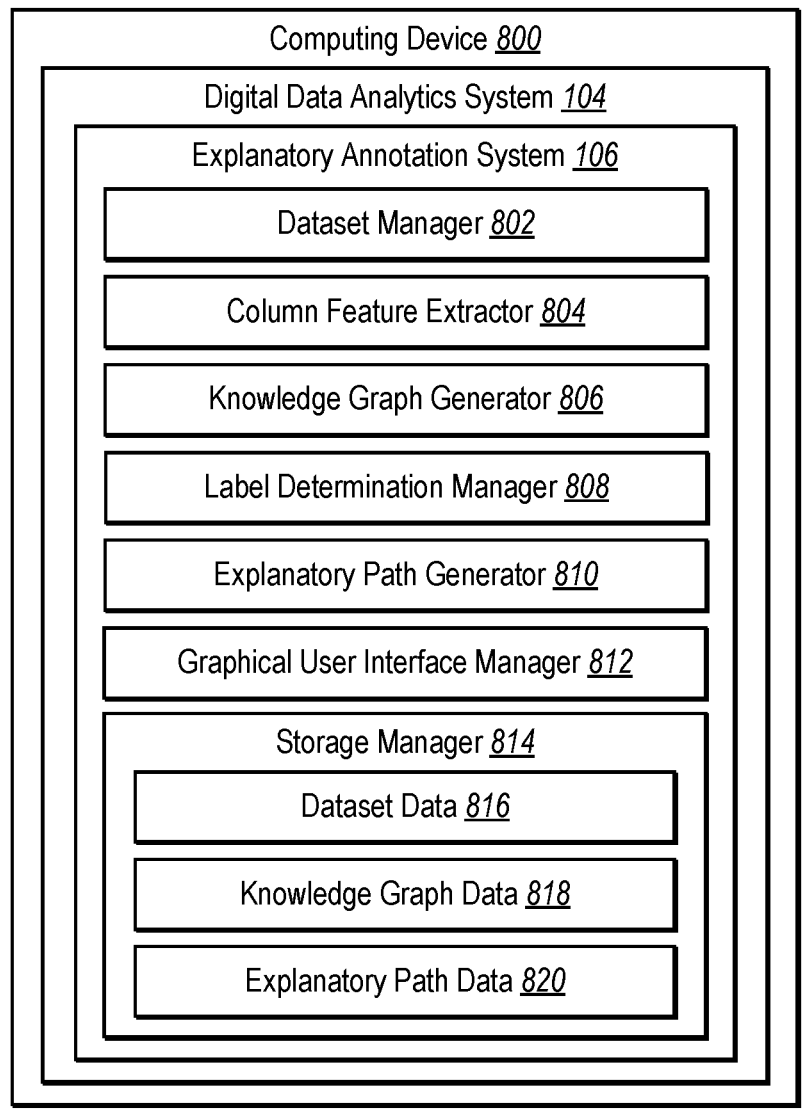
FIG. 8 illustrates a schematic diagram of an explanatory annotation system in accordance with one or more embodiments.

Turning now to FIG. 8, additional detail will be provided regarding components and capabilities of one embodiment of the explanatory annotation system. In particular, FIG. 8 illustrates an embodiment of an example explanatory annotation system 106 executed by a computing device 800 (e.g., the server device(s) 102 and/or the client device 110). As shown by the embodiment in FIG. 8, the computing device 800 can include or host the digital data analytics system 104 and the explanatory annotation system 106. The explanatory annotation system 106 can include a dataset manager 802, a column feature extractor 804, a knowledge graph generator 806, a label determination manager 808, an explanatory path generator 810, a graphical user interface manager 812, and a storage manager 814 which can include dataset data 816, knowledge graph data 818, and explanatory path data 820.

As just mentioned and as illustrated in the embodiment in FIG. 8, the explanatory annotation system 106 can include the dataset manager 802. For instance, the dataset manager 802 can identify, create, and/or receive datasets and/or columns as described above (e.g., in relation to FIGS. 2, 3A, 4, and 5A). Furthermore, the dataset manager 802 can store and/or integrate datasets and/or columns within a data volume or repository as described above (e.g., in relation to FIG. 2).

Furthermore, as illustrated in FIG. 8, the explanatory annotation system 106 can include the column feature extractor 804. For example, the column feature extractor 804 can extract one or more column features based on cell-level and/or character-level statistics from one or more columns as described above (e.g., in relation to FIGS. 4 and 5A). In addition, the column feature extractor 804 can extract one or more column features based on cell and/or header keywords from one or more columns as described above (e.g., in relation to FIGS. 4 and 5A).

Moreover, as illustrated in FIG. 8, the explanatory annotation system 106 can include the knowledge graph generator 806. For instance, the knowledge graph generator 806 can encode one or more columns, one or more column features, and/or one or more labels within a knowledge graph as described above (e.g., in relation to FIGS. 3A, 4, 5A, and 5B). In addition, the knowledge graph generator 806 can learn (e.g., using a deep learning model) a representation of a knowledge graph within a continuous space as described above (e.g., in relation to FIGS. 3A, 4, 5A, and 5B).

Furthermore, as shown in FIG. 8, the explanatory annotation system 106 can include the label determination manager 808. For example, the label determination manager 808 can determine a target label for a column within a knowledge graph using annotation distance scores as described above (e.g., in relation to FIGS. 3A and 6). Additionally, the label determination manager 808 can determine annotation distance scores between a column entity and candidate label entities within a knowledge graph (e.g., within a low dimensional representation of the knowledge graph) as described above (e.g., in relation to FIGS. 3A and 6).

In addition, as shown in FIG. 8, the explanatory annotation system 106 can include the explanatory path generator 810. For instance, the explanatory path generator 810 can generate an explanatory path between a column and a determined label for the column as described above (e.g., in relation to FIGS. 2, 3B, 7A, 7B, 7C, and 7D). In particular, the explanatory path generator 810 can determine a set of candidate paths between a column and a determined label in a knowledge graph as described above (e.g., in relation to FIGS. 2, 3B, 7A, and 7B). Moreover, the explanatory path generator 810 can rank and select one or more candidate labels from the set of candidate labels (e.g., using greedy ranking and/or diversified ranking) to generate an explanatory path for a column label determination as described above (e.g., in relation to FIGS. 2, 3B, 7C, and 7D).

Furthermore, as illustrated in FIG. 8, the explanatory annotation system 106 can include the graphical user interface manager 812. For example, the graphical user interface manager 812 can display a column and a determined label as described above (e.g., in relation to FIG. 2). In addition, the graphical user interface manager 812 can display an explanatory path as described above (e.g., in relation to FIGS. 2, 7A, 7B, 7C, and 7D).

Additionally, as shown in FIG. 8, the explanatory annotation system 106 can include the storage manager 814. The storage manager 814 (which can be included on one or more memory devices) can maintain data to perform the one or more functions of the explanatory annotation system 106. As shown, the storage manager 814 can include dataset data 816 (e.g., datasets, columns, headers, populated column cells, extracted column features), knowledge graph data 818 (e.g., column entities (or nodes), column feature entities, label entities, relational edges, vector embeddings for column entities, column feature entities, label entities, and relational edges, deep learning models, low dimensional representations, distance measures, distance scores, paths), and explanatory path data 820 (e.g., paths, path rankings, relational edge sequence patterns, relational edge sequences, diversity scores, distance scores).

Each of the components 802-820 of the computing device 800 (e.g., the computing device 800 implementing the explanatory annotation system 106), as shown in FIG. 8, may be in communication with one another using any suitable communication technologies. It will be recognized that although components 802-820 of the computing device 800 are shown to be separate in FIG. 8, any of components 802-820 may be combined into fewer components, such as into a single facility or module, divided into more components, or configured into different components as may serve a particular embodiment.

The components 802-820 of the computing device 800 can comprise software, hardware, or both. For example, the components 802-820 can comprise one or more instructions stored on a computer-readable storage medium and executable by processors of one or more computing devices. When executed by the one or more processors, the computer-executable instructions of the explanatory annotation system 106 (e.g., via the computing device 800) can cause a client device and/or a server device to perform the methods described herein. Alternatively, the components 802-820 and their corresponding elements can comprise hardware, such as a special purpose processing device to perform a certain function or group of functions. Additionally, the components 802-820 can comprise a combination of computer-executable instructions and hardware.

Furthermore, the components 802-820 of the explanatory annotation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-820 may be implemented as a stand-alone application, such as a desktop or mobile application. Furthermore, the components 802-820 may be implemented as one or more web-based applications hosted on a remote server. The components 802-820 may also be implemented in a suite of mobile device applications or "apps." To illustrate, the components 802-820 may be implemented in an application, including but not limited to, ADOBE EXPERIENCE PLATFORM, ADOBE ANALYTICS CLOUD, ADOBE ANALYTICS, ADOBE AUDIENCE MANAGER, ADOBE CAMPAIGN, and ADOBE TARGET. "ADOBE," "ADOBE EXPERIENCE PLATFORM," "ADOBE ANALYTICS CLOUD," "ADOBE ANALYTICS," "ADOBE AUDIENCE MANAGER," "ADOBE CAMPAIGN," and "ADOBE TARGET" are either registered trademarks or trademarks of Adobe Inc. in the United States and/or other countries.

Figure 9:
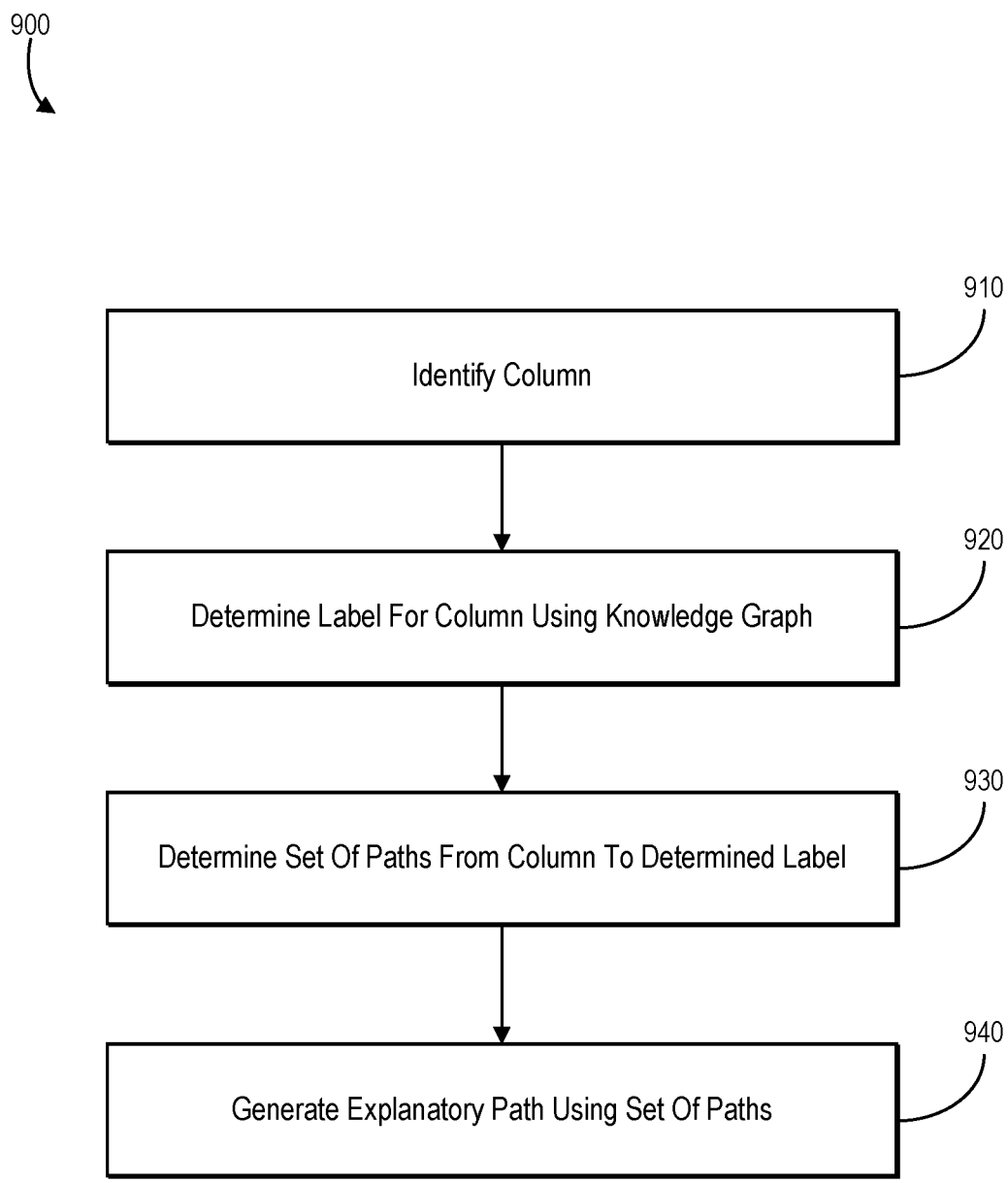
FIG. 9 illustrates a flowchart of a series of acts for generating explanatory paths for column annotations determined using a knowledge graph and a deep representation learning model.

FIGS. 1-8, the corresponding text, and the examples provide a number of different methods, systems, devices, and non-transitory computer-readable media of the explanatory annotation system 106. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned above, FIG. 9 illustrates a flowchart of a series of acts 900 for generating explanatory paths for column annotations determined using a knowledge graph and a deep representation learning model. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing (or computer) device to perform the acts of FIG. 9. In some embodiments, a system can perform the acts of FIG. 9 (e.g., a system can include one or more memory devices and/or one or more server devices configured to perform the acts of FIG. 9).

As illustrated in FIG. 9, the series of acts 900 includes an act 910 of identifying a column. In particular, the act 910 can include identifying a column within a digital dataset. For example, the act 910 can include identifying a column by traversing a digital dataset received by a client device to identify headers and/or cell values corresponding to a column.

As illustrated in FIG. 9, the series of acts 900 includes an act 920 of determining a label for a column using a knowledge graph. In particular, the act 920 can include determining a label for a column utilizing a knowledge graph that includes the column, one or more column features, one or more relational edges, and one or more candidate labels. Furthermore, the act 920 can include determining a label for a column by utilizing annotation distance scores between the column and one or more candidate labels within a knowledge graph. Moreover, the act 920 can include determining a label for a column utilizing a knowledge graph by encoding a column within a knowledge graph and determining the label for the column utilizing annotation distance scores between the column and one or more candidate labels within the knowledge graph. In addition, the act 920 can include generating a knowledge graph by encoding one or more column features, one or more relational edges, and one or more candidate labels in a latent vector space.

As illustrated in FIG. 9, the series of acts 900 includes an act 930 of determining a set of paths from a column to a determined label. In particular, the act 930 can include determining a set of paths from a column to a determined label. For example, paths from a set of paths can include relational edge sequences and corresponding cumulative distance scores between a column, one or more neighbor nodes, and a determined label within a knowledge graph. Furthermore, the act 930 can include determining paths having relational edge sequences and corresponding cumulative distance scores between a column, one or more neighbor nodes, and a determined label by identifying a first relational edge and a first distance value between the column and a neighbor node within a knowledge graph, identifying a second relational edge and a second distance value between the neighbor node and the determined label within the knowledge, determining a relational edge sequence utilizing the first relational edge and the second relational edge, and determining a cumulative distance score utilizing the first distance value and the second distance value.

As illustrated in FIG. 9, the series of acts 900 includes an act 940 of generating an explanatory path using a set of paths. In particular, the act 940 can include generating an explanatory path from a column to a determined label by selecting a path from a set of paths based on cumulative distance scores corresponding to a set of paths. Furthermore, the act 940 can include generating an explanatory path from a column to a determined label by selecting a path corresponding to a lowest cumulative distance score from cumulative distance scores corresponding to a set of paths. Additionally, the act 940 can include generating an explanatory path from a column to a determined label by selecting a threshold number of paths from a set of paths based on cumulative distance scores corresponding to the set of paths. For example, an explanatory path can include a representation of a relational edge sequence, corresponding to a selected path, between a column, one or more neighbor nodes from the selected path, and a determined label within a knowledge graph. Furthermore, the act 940 can include providing, for display via a user interface, a determined label and/or an explanatory path to a client device.

Moreover, the act 940 can include generating an explanatory path from a column to a determined label by selecting one or more paths from a set of paths based on cumulative distance scores and relational edge sequence diversities corresponding to the set of paths. Furthermore, the act 940 can include determining relational edge sequence diversities corresponding to a set of paths based on one or more relational edge sequence patterns corresponding to paths from a set of paths. In addition, the act 940 can include selecting one or more paths from a set of paths based on cumulative distance scores and relational edge sequence diversities corresponding to the set of paths by determining a first subset of paths corresponding to a first relational edge sequence pattern and a second subset of paths corresponding to a second relational edge sequence pattern, selecting a first path from the first subset of paths corresponding to the first relational edge sequence pattern, and selecting a second path from the second subset of paths corresponding to the second relational edge sequence pattern. Furthermore, the act 940 can include selecting one or more paths from a set of paths based on cumulative distance scores and relational edge sequence diversities corresponding to the set of paths by ranking a first subset of paths and a second subset of paths based on cumulative distance scores, selecting a first path from the first subset of paths corresponding to a first relational edge sequence pattern based on the ranking of the first subset of paths, and selecting a second path from the second subset of paths corresponding to a second relational edge sequence pattern based on the ranking of the second subset of paths.

In addition to (or in the alternative to) the acts above, the series of acts 900 can also include a step for generating an explanatory path from a column to a determined label using a set of paths determined from a knowledge graph. For example, the acts and algorithms described above in relation to FIGS. 3A-3B, 7A-7D (e.g., the acts 302-310 and/or 702-748) can comprise the corresponding acts and algorithms (i.e., structure) for performing a step for generating an explanatory path from a column to a determined label using a set of paths determined from a knowledge graph.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
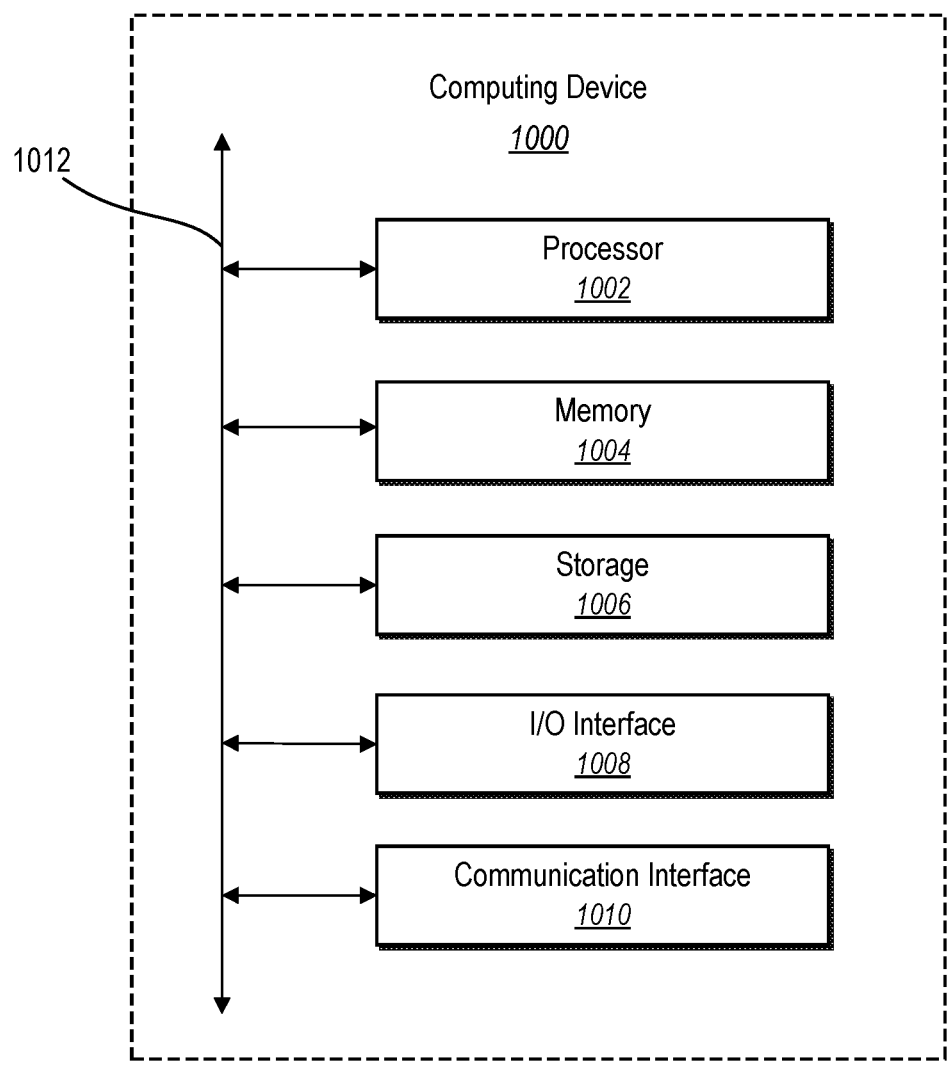
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying a column within a digital dataset;
   determining a label for the column utilizing a knowledge graph by:
   encoding the column, one or more column features, one or more relational edges, and one or more candidate labels within the knowledge graph; and
   determining the label for the column utilizing annotation distance scores between the column and the one or more candidate labels within the knowledge graph;
   determining a set of paths from the column to the determined label, wherein the paths from the set of paths comprise relational edge sequences and corresponding cumulative distance scores between the column, one or more neighbor nodes, and the determined label within the knowledge graph;
   generating an explanatory path from the column to the determined label by selecting a path from the set of paths based on the cumulative distance scores corresponding to the set of paths; and
   providing, for display via a user interface of a client device, the determined label and the explanatory path.

2. The computer-implemented method of claim 1, further comprising generating the explanatory path from the column to the determined label by selecting a path corresponding to a lowest cumulative distance score from the cumulative distance scores corresponding to the set of paths.

3. The computer-implemented method of claim 1, further comprising generating the explanatory path from the column to the determined label by selecting one or more paths from the set of paths based on the cumulative distance scores and relational edge sequence diversities corresponding to the set of paths.

4. The computer-implemented method of claim 1, wherein the explanatory path comprises a representation of a relational edge sequence, corresponding to a selected path from the set of paths, between the column, one or more neighbor nodes from the selected path, and the determined label within the knowledge graph.

5. A non-transitory computer-readable medium storing instructions that, when executed by at least one processor, cause a computer device to:
   identify a column within a digital dataset;
   determine a label for the column utilizing a knowledge graph by:
   encoding the column, one or more column features, one or more relational edges, and one or more candidate labels within the knowledge graph; and
   determining the label for the column utilizing annotation distance scores between the column and the one or more candidate labels within the knowledge graph;
   determine a set of paths from the column to the determined label, wherein paths from the set of paths comprise relational edge sequences and corresponding cumulative distance scores between the column, one or more neighbor nodes, and the determined label within the knowledge graph;
   generate an explanatory path from the column to the determined label by selecting a path from the set of paths based on the cumulative distance scores corresponding to the set of paths; and
   provide, for display via a user interface of a client device, the determined label and the explanatory path.

6. The non-transitory computer-readable medium of claim 5, further storing instructions that, when executed by the at least one processor, cause the computer device to generate the knowledge graph by encoding the one or more column features, the one or more relational edges, and the one or more candidate labels in a latent space.

7. The non-transitory computer-readable medium of claim 5, further storing instructions that, when executed by the at least one processor, cause the computer device to determine the paths comprising the relational edge sequences and the corresponding cumulative distance scores between the column, the one or more neighbor nodes, and the determined label by:
identifying a first relational edge and a first distance value between the column and a neighbor node within the knowledge graph;
identifying a second relational edge and a second distance value between the neighbor node and the determined label within the knowledge graph;
determining a relational edge sequence utilizing the first relational edge and the second relational edge; and
determining a cumulative distance score utilizing the first distance value and the second distance value.

8. The non-transitory computer-readable medium of claim 5, further storing instructions that, when executed by the at least one processor, cause the computer device to generate the explanatory path from the column to the determined label by selecting a path corresponding to a lowest cumulative distance score from the cumulative distance scores corresponding to the set of paths.

9. The non-transitory computer-readable medium of claim 5, further storing instructions that, when executed by the at least one processor, cause the computer device to generate the explanatory path from the column to the determined label by selecting one or more paths from the set of paths based on the cumulative distance scores and relational edge sequence diversities corresponding to the set of paths.

10. The non-transitory computer-readable medium of claim 9, further storing instructions that, when executed by the at least one processor, cause the computer device to select the one or more paths from the set of paths based on the cumulative distance scores and the relational edge sequence diversities corresponding to the set of paths by:
determining a first subset of paths corresponding to a first relational edge sequence pattern and a second subset of paths corresponding to a second relational edge sequence pattern;
selecting a first path from the first subset of paths corresponding to the first relational edge sequence pattern; and
selecting a second path from the second subset of paths corresponding to the second relational edge sequence pattern.

11. The non-transitory computer-readable medium of claim 10, further storing instructions that, when executed by the at least one processor, cause the computer device to select the one or more paths from the set of paths based on the cumulative distance scores and the relational edge sequence diversities corresponding to the set of paths by:
ranking the first subset of paths and the second subset of paths based on the cumulative distance scores;
selecting the first path from the first subset of paths corresponding to the first relational edge sequence pattern based on the ranking of the first subset of paths; and
selecting the second path from the second subset of paths corresponding to the second relational edge sequence pattern based on the ranking of the second subset of paths.

12. The non-transitory computer-readable medium of claim 5, further storing instructions that, when executed by the at least one processor, cause the computer device to generate the explanatory path from the column to the determined label by selecting a threshold number of paths from the set of paths based on the cumulative distance scores corresponding to the set of paths.

13. The non-transitory computer-readable medium of claim 5, wherein the explanatory path comprises a representation of a relational edge sequence, corresponding to the selected path, between the column, one or more neighbor nodes from the selected path, and the determined label within the knowledge graph.

14. The non-transitory computer-readable medium of claim 5, further storing instructions that, when executed by the at least one processor, cause the computer device to provide, for display via the user interface of the client device, the explanatory path indicating multiple paths to the determined label.

15. A system comprising:
one or more memory devices comprising a knowledge graph comprising a column, one or more column features, one or more relational edges, and one or more candidate labels; and
one or more server devices configured to cause the system to:
determine a label for the column utilizing the knowledge graph by:
encoding the column, one or more column features, one or more relational edges, and one or more candidate labels within the knowledge graph; and
determining the label for the column utilizing annotation distance scores between the column and the one or more candidate labels within the knowledge graph;
determine a set of paths from the column to the determined label, wherein paths from the set of paths comprise relational edge sequences and corresponding cumulative distance scores between the column, one or more neighbor nodes, and the determined label within the knowledge graph;
determine relational edge sequence diversities corresponding to the set of paths based on one or more relational edge sequence patterns corresponding to the paths from the set of paths;
generate an explanatory path from the column to the determined label by selecting a plurality of paths from the set of paths based on the cumulative distance scores and the relational edge sequence diversities corresponding to the set of paths; and
provide, for display via a user interface of a client device, the determined label and the explanatory path.

16. The system of claim 15, wherein the one or more server devices are configured to cause the system to determine the label for the column utilizing the knowledge graph by utilizing annotation distance scores between the column and the one or more candidate labels within the knowledge graph, wherein the knowledge graph comprises an encoding of the column, the one or more column features, the one or more relational edges, and the one or more candidate labels in a latent space.

17. The system of claim 15, wherein the one or more server devices are configured to cause the system to determine the paths comprising the relational edge sequences and the corresponding cumulative distance scores between the column, the one or more neighbor nodes, and the determined label by:
- identifying a first relational edge and a first distance value between the column and a neighbor node within the knowledge graph;
- identifying a second relational edge and a second distance value between the neighbor node and the determined label within the knowledge graph;
- determining a relational edge sequence utilizing the first relational edge and the second relational edge; and
- determining a cumulative distance score utilizing the first distance value and the second distance value.

18. The system of claim 15, wherein the one or more server devices are configured to cause the system to select the plurality of paths from the set of paths based on the cumulative distance scores and the relational edge sequence diversities corresponding to the set of paths by:
- determining a first subset of paths corresponding to a first relational edge sequence pattern and a second subset of paths corresponding to a second relational edge sequence pattern;
- selecting a first path from the first subset of paths corresponding to the first relational edge sequence pattern; and
- selecting a second path from the second subset of paths corresponding to the second relational edge sequence pattern.

19. The system of claim 18, wherein the one or more server devices are configured to cause the system to select the plurality of paths from the set of paths based on the cumulative distance scores and the relational edge sequence diversities corresponding to the set of paths by:
- ranking the first subset of paths and the second subset of paths based on the cumulative distance scores;
- selecting the first path from the first subset of paths corresponding to the first relational edge sequence pattern based on the ranking of the first subset of paths; and
- selecting the second path from the second subset of paths corresponding to the second relational edge sequence pattern based on the ranking of the second subset of paths.

20. The system of claim 15, wherein the explanatory path comprises a representation of a relational edge sequence, corresponding to the selected path, between the column, one or more neighbor nodes from the selected path, and the determined label within the knowledge graph.

* * * * *